(12) United States Patent
Iwata

(10) Patent No.: US 8,657,086 B2
(45) Date of Patent: Feb. 25, 2014

(54) ROTARY DAMPER MOUNTING ASSEMBLY AND ROTARY DAMPER APPARATUS

(75) Inventor: Shinpei Iwata, Tokyo (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 204 days.

(21) Appl. No.: 13/105,771

(22) Filed: May 11, 2011

(65) Prior Publication Data
US 2011/0278119 A1 Nov. 17, 2011

(30) Foreign Application Priority Data

May 13, 2010 (JP) .................................. 2010-111138

(51) Int. Cl.
F16F 9/32 (2006.01)
F16F 9/54 (2006.01)

(52) U.S. Cl.
USPC ........ 188/322.19; 188/83; 188/129; 188/130; 188/281; 188/288; 188/290; 188/306; 4/240; 4/248; 16/240; 16/248

(58) Field of Classification Search
USPC ............ 188/322.19, 130, 131, 281, 306–307, 188/322.5, 293, 290–291, 267.2, 276, 288; 267/208; 4/236, 248, 240, 246.1
See application file for complete search history.

(56) References Cited

U.S. PATENT DOCUMENTS

| | | | | |
|---|---|---|---|---|
| 3,038,561 A | * | 6/1962 | Rumsey et al. | 188/278 |
| 5,768,718 A | * | 6/1998 | Sorimachi | 4/236 |
| 6,637,558 B2 | * | 10/2003 | Oliver et al. | 188/267.2 |
| 6,913,125 B2 | * | 7/2005 | Hayashi | 188/290 |
| 6,913,252 B2 | * | 7/2005 | Hayashi | 267/208 |
| 2010/0258395 A1 | * | 10/2010 | Busi | 188/306 |

FOREIGN PATENT DOCUMENTS

JP 2010-001983 A 1/2010

OTHER PUBLICATIONS

English translation of JP Patent Application No. 2010-001983, published Jan. 7, 2010 (21 pages).

* cited by examiner

Primary Examiner — Robert A Siconolfi
Assistant Examiner — San Aung
(74) Attorney, Agent, or Firm — Osha Liang LLP

(57) ABSTRACT

An identical engagement hole 12b is formed in each of first and second brackets 1, 2. A first engagement portion 31c is formed in a damper body 31 of a rotary damper 3. A distal end portion of a rotor 32 of the rotary damper 3 is non-rotatably inserted in an adapter 4. A third engagement portion 46 is formed in an outer circumference of the adapter 4. The first engagement portion 31c is non-rotatably inserted in the engagement hole 12b of the first bracket 1. The third engagement portion 46 is non-rotatably inserted in the engagement hole 12b of the second bracket 2.

12 Claims, 22 Drawing Sheets

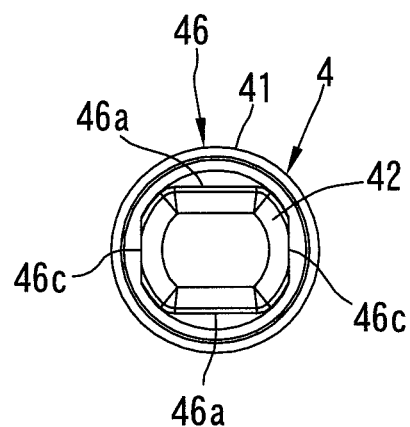
F I G. 49
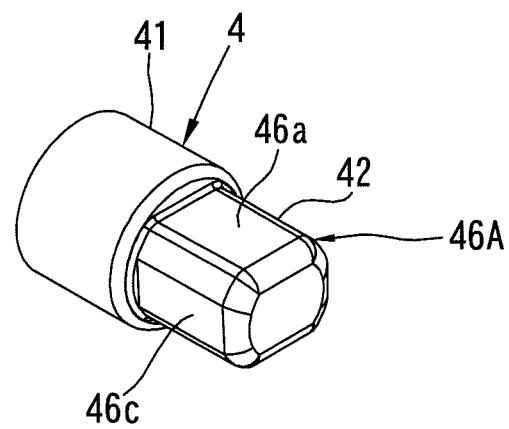
F I G. 50

ROTARY DAMPER MOUNTING ASSEMBLY AND ROTARY DAMPER APPARATUS

TECHNICAL FIELD

The present invention relates to a rotary damper mounting assembly to be used for mounting a rotary damper between a body and a door or between a housing and a door. The present invention also relates to a rotary damper apparatus provided with such a mounting assembly.

BACKGROUND ART

One example of a conventional rotary damper is taught in the patent document 1 listed below. The rotary damper includes a damper body having a bottomed circular cylindrical configuration and a rotor, a basal end portion of which is rotatably inserted in the damper body. A first engagement portion including two flat surface portions parallel to each other is formed in a basal end portion of an outer circumferential surface of the damper body, i.e., an end portion of the damper body on a bottom portion side. On the other hand, in a distal end portion of the rotor protruded from the damper body, a second engagement portion including two flat surface portions parallel to each other is formed. A damper mechanism is built-in between the damper body and the rotor. The damper mechanism prohibits the rotor from rotating at a high speed in one direction, maintaining the rotational speed of the rotor at a low speed, and allows the rotor to rotate at a high speed in the other direction.

To mount a rotary damper having the above-described features between a toilet body and a toilet seat, for example, the toilet body may be provided with a first bracket and the toilet seat may be provided with a second bracket. The first bracket includes a first engagement hole. The first engagement portion of the damper body is non-rotatably inserted in the first engagement hole. On the other hand, the second bracket includes a second engagement hole. The second engagement portion of the rotor is non-rotatably inserted in the second engagement hole. By this arrangement, the toilet seat is rotatably connected to the toilet body through the first and second brackets and the rotary damper. When the toilet seat is rotated, the rotor is rotated with respect to the damper body accompanying the rotation of the toilet seat. When the toilet seat is rotated in a closing direction, a rotation speed of the toilet seat is maintained at a low speed by the rotary damper. When the toilet seat is rotated in an opening direction, the rotation speed of the toilet seat is not maintained at a low speed by the rotary damper, and the toilet seat can be rotated at a high speed.

PRIOR ART DOCUMENT

Patent Document

Patent Document 1: Japanese Patent Application Publication No. 2010-001983

SUMMARY OF INVENTION

Technical Problem

In the prior art rotary damper, the first engagement portion of the damper body and the second engagement portion of the rotor are formed to be different from each other in shape and in dimensions. Accordingly, the first and second engagement holes of the first and second brackets are also formed to be different from each other in shape and in dimensions. Therefore, if the first and second brackets, which should be respectively attached to the toilet body and the toilet seat, are respectively attached to the toilet seat and the toilet body by mistake, a problem may arise in which the rotary damper can not be attached to the first and second brackets or a mounting relationship between the damper body and the rotor of the rotary damper and a mounting relationship between the toilet body and the toilet seat are opposite to the normal relationships.

Solution to Problem

To solve the problem mentioned above, a first aspect of the present invention provides a rotary damper mounting assembly for use with a rotary damper, the rotary damper comprising: a damper body and a rotor rotatable with respect to the damper body, a first engagement portion being formed in the damper body, a second engagement portion being formed in the rotor, outer dimensions of the second engagement portion being smaller than outer dimensions of the first engagement portion, the first engagement portion being non-rotatably inserted in a first engagement hole of a first bracket, the second engagement portion being non-rotatably inserted in a second engagement hole of a second bracket, the first engagement portion being non-rotatably insertable into the first engagement hole and the second engagement hole, the mounting assembly comprising: a cylindrical adapter, the second engagement portion being non-rotatably inserted into the adapter, a third engagement portion being formed in an outer circumferential surface of the adapter, the third engagement portion being non-rotatably insertable into the first engagement hole and the second engagement hole, the second engagement portion being non-rotatably inserted in the second engagement hole through the third engagement portion.

In this case, it is preferable that the damper body is formed in a cylindrical configuration having a bottom portion in a basal end portion of the damper body; the first engagement portion is formed in a basal end portion of an outer circumferential surface of the damper body; a basal end portion of the rotor is rotatably inserted in the damper body; and the second engagement portion is formed in a distal end portion of the rotor protruded out of the damper body.

It is preferable that a fitting cylindrical part is integrally provided in a distal end portion of the adapter on the damper body side; a distal end portion of the damper body is rotatably fitted in the fitting cylindrical part; and the second engagement portion is non-rotatably inserted in a basal end portion of the adapter.

It is preferable that an annular protruded portion is formed in a central portion of an outer circumferential surface of the fitting cylindrical part in an axial direction of the fitting cylindrical part; and the annular protruded portion extends in an annular configuration along a circumferential direction of the fitting cylindrical part.

It is preferable that a first support hole is formed in the first bracket; a distal end portion of the fitting cylindrical part can be rotatably fitted into the first support hole; the first engagement hole is formed in a bottom portion of the first support hole; a second support hole is formed in the second bracket; a basal end portion of the fitting cylindrical part can be rotatably fitted into the second support hole; and the second engagement hole is formed in a bottom portion of the second support hole.

It is preferable that a cross-sectional configuration of the first engagement portion and a cross-sectional configuration of the third engagement portion are identical to each other; and a cross-sectional configuration of the first engagement hole and a cross-sectional configuration of the second engagement hole are identical to each other.

To solve the problem mentioned above, a second aspect of the present invention provides a rotary damper apparatus comprising: a rotary damper comprising a damper body and a rotor rotatable with respect to the damper body, a first engagement portion being formed in the damper body, a second engagement portion being formed in the rotor, outer dimensions of the second engagement portion being smaller than outer dimensions of the first engagement portion; a first bracket, a first engagement hole being formed in the first bracket; a second bracket, a second engagement hole being formed in the second bracket; the first engagement portion being non-rotatably insertable into the first engagement hole and the second engagement hole; and an adapter having a cylindrical configuration, the second engagement portion being non-rotatably inserted in the adapter, a third engagement portion being formed in an outer circumferential surface of the adapter, the third engagement portion being non-rotatably insertable into the first engagement hole and the second engagement hole, the second engagement portion being non-rotatably inserted in the second engagement hole through the third engagement portion.

In this case, it is preferable that the damper body is formed in a cylindrical configuration having a bottom portion in a basal end portion of the damper body; the first engagement portion is formed in a basal end portion of an outer circumferential surface of the damper body; a basal end portion of the rotor is rotatably inserted in the damper body; and the second engagement portion is formed in a distal end portion of the rotor protruded out of the damper body.

It is preferable that a fitting cylindrical part is integrally provided in a distal end portion of the adapter on the damper body side; a distal end portion of the damper body is rotatably fitted in the fitting cylindrical part; and the second engagement portion is non-rotatably inserted in a basal end portion of the adapter.

It is preferable that an annular protruded portion is formed in a central portion of an outer circumferential surface of the fitting cylindrical part in an axial direction of the fitting cylindrical part; and the annular protruded portion extends in an annular configuration along a circumferential direction of the fitting cylindrical part.

It is preferable that a first support hole is formed in the first bracket; a distal end portion of the fitting cylindrical part is rotatably fitted in the first support hole; the first engagement hole is formed in a bottom portion of the first support hole; a second support hole is formed in the second bracket; a basal end portion of the fitting cylindrical part is rotatably fitted in the second support hole; and the second engagement hole is formed in a bottom portion of the second support hole.

It is preferable that a cross-sectional configuration of the first engagement portion and a cross-sectional configuration of the third engagement portion are identical to each other; and a cross-sectional configuration of the first engagement hole and a cross-sectional configuration of the second engagement hole are identical to each other.

Advantageous Effects of Invention

According to the present invention having the above-mentioned features, both of the first engagement portion formed in the damper body and the third engagement portion formed in the adapter can be non-rotatably inserted in the first engagement hole and the second engagement hole. Therefore, when the rotary damper is to be mounted between a body and a rotating member through the first and second brackets, the rotary damper can be mounted on the body and the rotating member through the first and second brackets regardless of which of the first and second brackets is attached to which of the body and the rotating member. Moreover, the rotary damper can be mounted such that a mounting relationship between the damper body and the rotor and the body and the rotating member are normal.

BRIEF DESCRIPTION OF DRAWINGS

FIG. 49 is a view on arrow X of FIG. 48.

FIG. 50 is a perspective view of the adapter.

DESCRIPTION OF EMBODIMENTS

Figure 1:
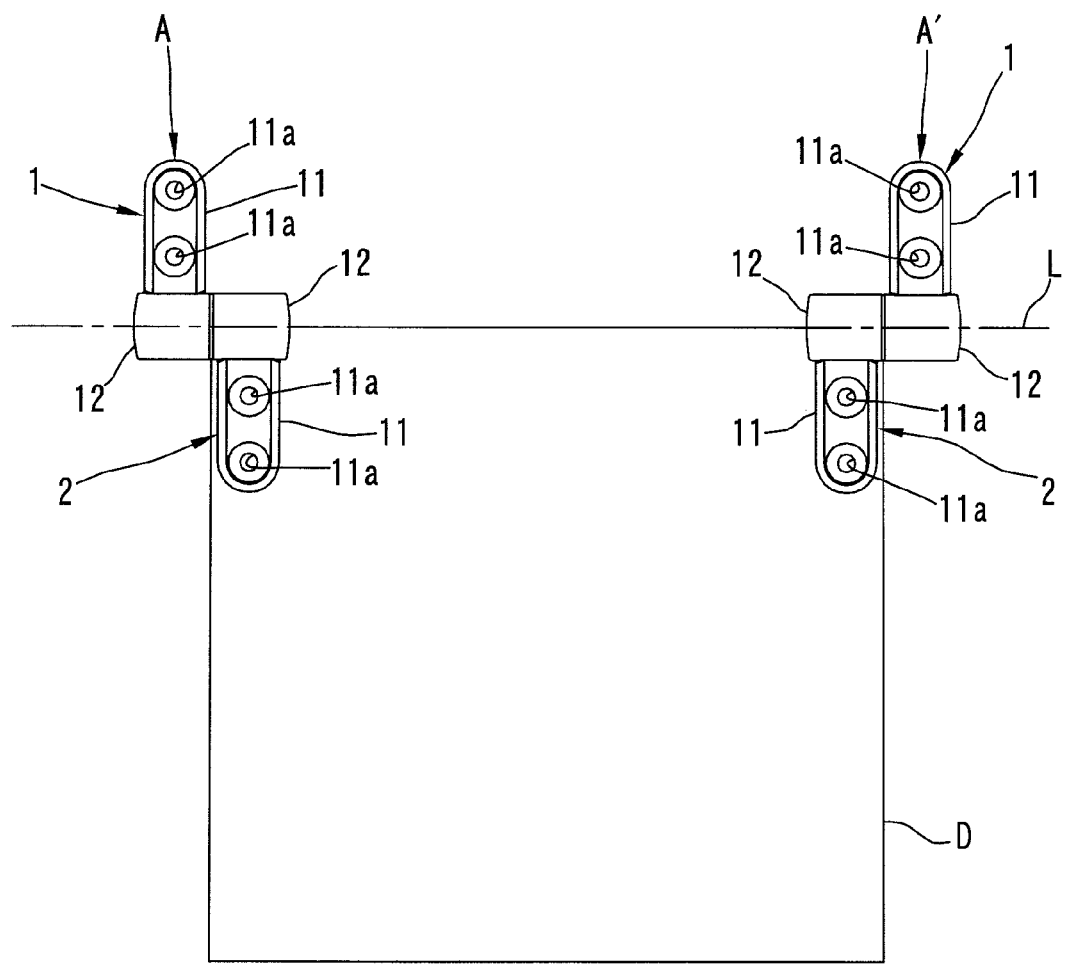
FIG. 1 shows a first embodiment of a rotary damper apparatus according to the present invention, in which the rotary damper apparatus is used between a housing and a door.
Figure 2:
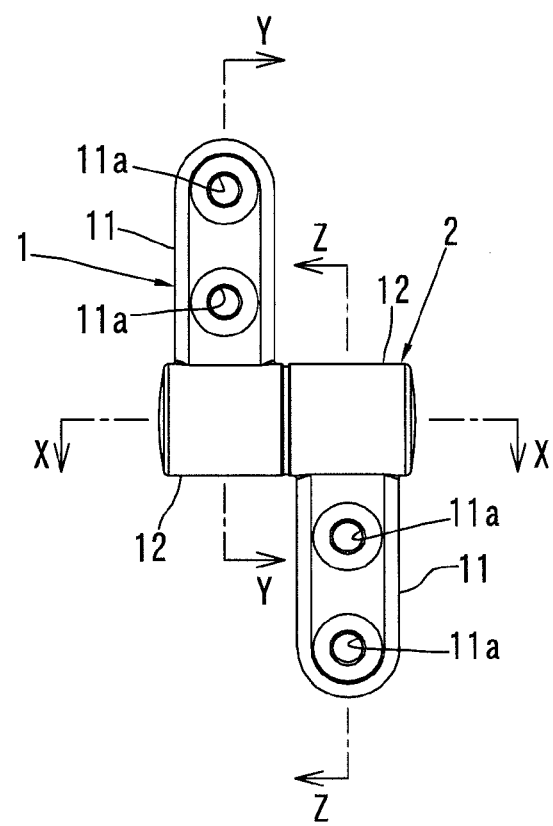
FIG. 2 is a plan view of the first embodiment.
Figure 3:
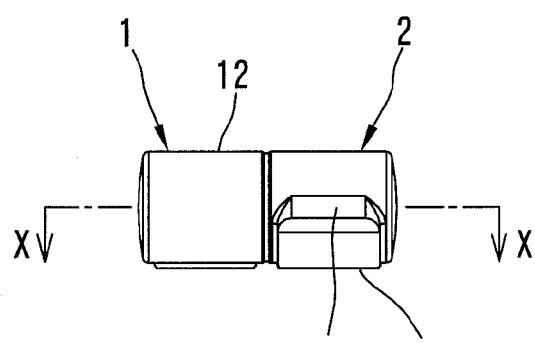
FIG. 3 is a front view of the first embodiment.
Figure 4:
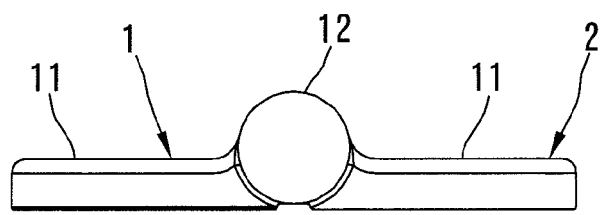
FIG. 4 is a side view of the first embodiment.

A best mode for carrying out the present invention will be described hereinafter with reference to the drawings.

FIGS. 1 to 23 show a first embodiment of the present invention. In this embodiment, a rotary damper apparatus according to the present invention is provided between a body (not shown) and a door D for opening and closing an opening of the body. Particularly in this embodiment, two rotary damper apparatuses A, A' are used. The two rotary damper apparatuses A, A' are constructed in mirror symmetry to each other. Therefore, only the rotary damper apparatus A will be described here. Same reference numerals will be used to refer to the components of the rotary damper apparatus A and the components of the rotary damper apparatus A' corresponding to each other and the description of the rotary damper apparatus A' will be omitted.

As shown in FIGS. 1 to 6, the rotary damper apparatus A includes a first bracket 1, a second bracket 2, a rotary damper 3 and an adapter 4. The first bracket 1 is attached to the body. The second bracket 2 is attached to an upper end portion of the door D. The first bracket 1 and the second bracket 2 are rotatably connected to each other through the rotary damper 3 and the adapter 4. The axes of the rotary damper 3 and the adapter 4 are oriented in a horizontal direction. By this arrangement, the door D is connected to the body such that the door D can be rotated about a horizontal rotational axis L (axis of the rotary damper). The door D can be rotated between a closed position shown in FIG. 1 and an open position in which a lower end portion of the door D is moved (rotated) upward to a predetermined position. When the door D is rotated downward from the open position toward the closed position, a rotation speed of the door D is maintained at a low speed by the rotary damper 3. When the door D is rotated upward from the closed position toward the open position, the rotary damper 3 allows the door D to be rotated at a high speed.

The rotary damper apparatus A will be described in detail hereinafter. For the convenience of description, the rotary damper 3 will be described first. As shown in FIGS. 9 to 12, the rotary damper 3 includes a damper body 31 and a rotor 32. The damper body 31 has a cylindrical configuration having a circular cross-sectional configuration. A basal end portion of the damper body 31 is closed by a bottom portion 31a. The damper body 31 has an opening in a distal end portion thereof. Two flat surface portions 31b are formed in an outer circumferential surface of the basal end portion of the damper body 31. The two flat surface portions 31b, 31b extend from a basal end of the damper body 31 along an axis of the damper body 31 to a central portion of the damper body 31 in a longitudinal direction thereof. The two flat surface portions 31b, 31b are spaced from each other by 180 degrees in a circumferential direction of the damper body 31. By forming the two flat surface portions 31b, 31b having the features mentioned above, a first engagement portion 31c having a generally elliptical cross-sectional configuration is formed in the basal end portion of the damper body 31. On the other hand, a generally half of the damper body 31 on a distal end side thereof is a circular cylindrical portion 31d having a circular cross-sectional configuration and a constant outer diameter.

The rotor 32 has a shaft configuration having a circular cross-sectional configuration. A basal end portion of the rotor 32 is inserted in the damper body 31 such that the rotor 32 can be rotated about the axis (rotational axis L) of the damper body 31. When the rotor 32 is rotated in one direction, a rotation speed of the rotor 32 is maintained at a low speed by a damper mechanism (not shown) provided inside the damper body 31. When the rotor 32 is rotated in the other direction, the rotor 32 is allowed to be rotated at a high speed. Various kinds of known damper mechanisms may be adopted as a damper mechanism having such features. Other known damper mechanisms that can maintain the rotation speed of the rotor 32 at a low speed regardless of the direction in which the rotor 32 is rotated may also be adopted as the damper mechanism.

A distal end portion of the rotor 32 is protruded out of the damper body 31 through the opening of the damper body 31. Two flat surface portions 32a, 32a are formed in an outer circumferential surface of the distal end portion of the rotor 32 protruded from the damper body 31. The flat surface portions 32a extend from a distal end surface of the rotor 32 generally up to a distal end edge of the damper body 31 along the axis (rotational axis L) of the rotor 32. The two flat surface portions 32a, 32a are spaced from each other by 180 degrees in a circumferential direction of the rotor 32. By forming the two flat surface portions 32a, 32a having the above mentioned features, a second engagement portion 32b having an elliptical cross-sectional configuration is formed in the distal end portion of the rotor 32 protruded from the damper body 31. An outer diameter of the second engagement portion 32b, i.e., an outer diameter of the distal end portion of the rotor 32 protruded from the damper body 31, is smaller than an outer diameter of the damper body 31, i.e., an outer diameter of the first engagement portion 31c. A distance between the flat surface portions 32a, 32a is shorter than a distance between the flat surface portions 31b, 31b of the first engagement portion 31c. As a result, outer dimensions of the second engagement portion 32b are smaller than outer dimensions of the first engagement portion 31c. Therefore, when the first engagement portion 31c is superposed on the second engagement portion 32b in an axial direction thereof with the axis of the first engagement portion 31c and the axis of the second engagement portion 32b aligned with each other and with the flat portions 31b, 32a topologically aligned in the circumferential direction, an entirety of the second engagement portion 32b is included in a spacial area defined by an outline of the first engagement portion 31c.

The adapter 4 will be described next. As shown in FIGS. 13 to 20, the adapter 4 has a bottomed cylindrical configuration. A fitting cylindrical part 41 is formed in a distal end portion of the adapter 4 and an engagement cylindrical part 42 is formed in a basal end portion of the adapter 4.

Figure 16:
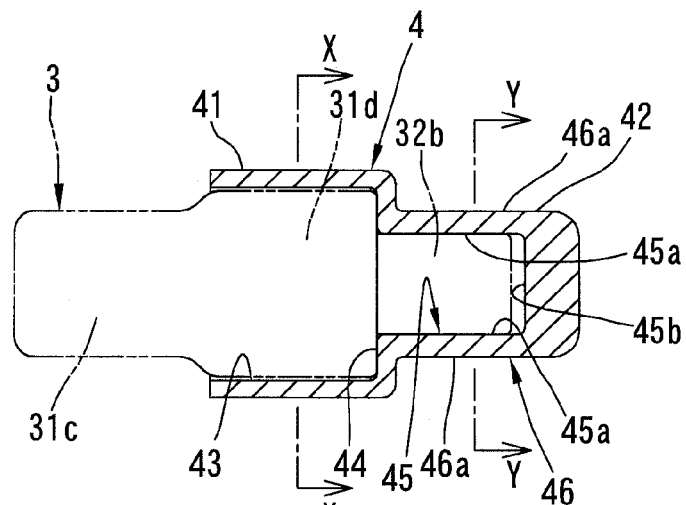
FIG. 16 is a cross-sectional view along line X-X of FIG. 13.
Figure 17:
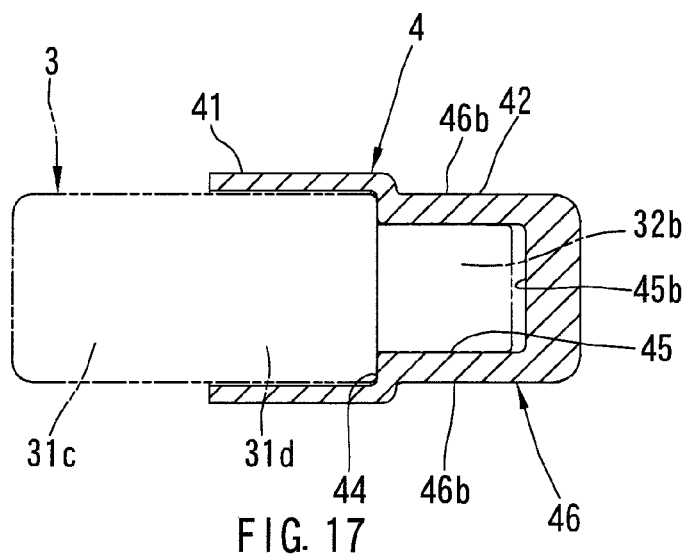
FIG. 17 is a cross-sectional view along line X-X of FIG. 14.
Figure 18:
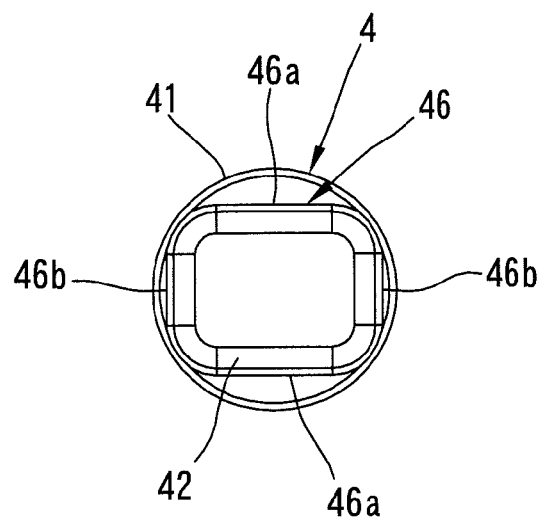
FIG. 18 is a view on arrow Y of FIG. 13.
Figure 19:
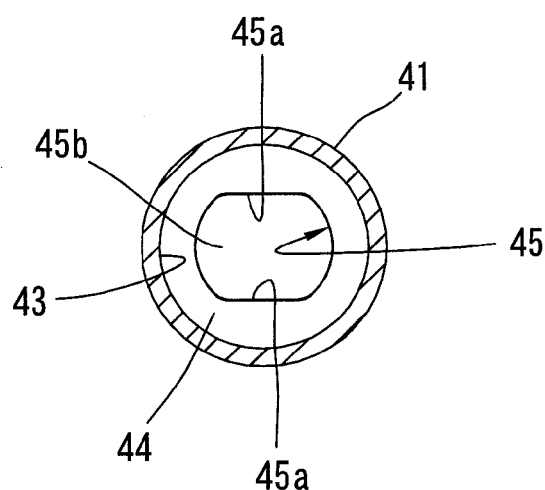
FIG. 19 is a cross-sectional view along line X-X of FIG. 16.
Figure 20:
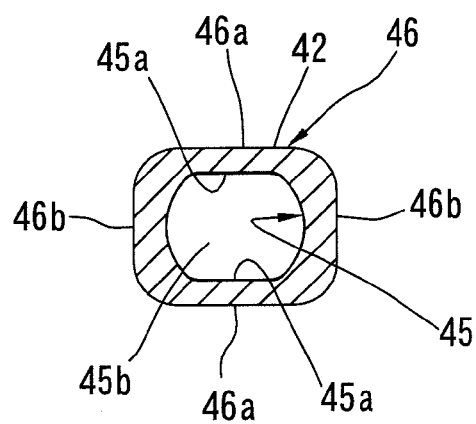
FIG. 20 is a cross-sectional view along line Y-Y of FIG. 16.
Figure 21:
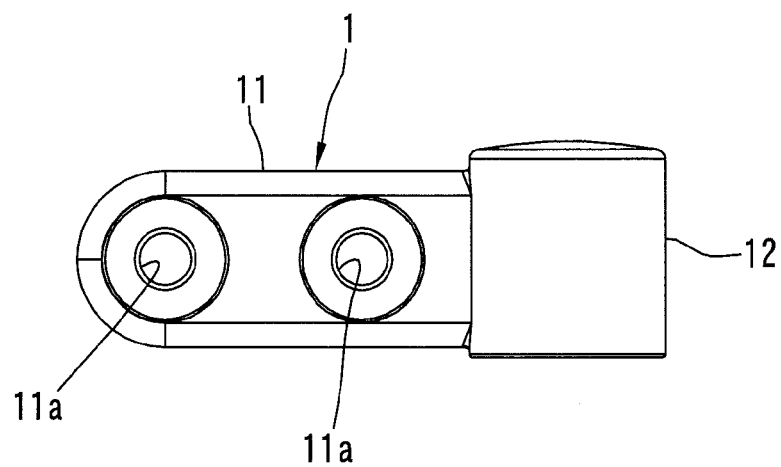
FIG. 21 is a plan view of a first bracket used in the first embodiment.
Figure 22:
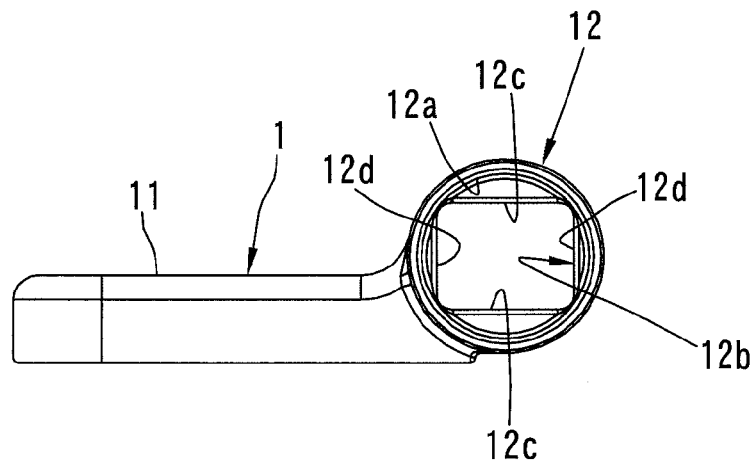
FIG. 22 is a front view of the first bracket.
Figure 23:
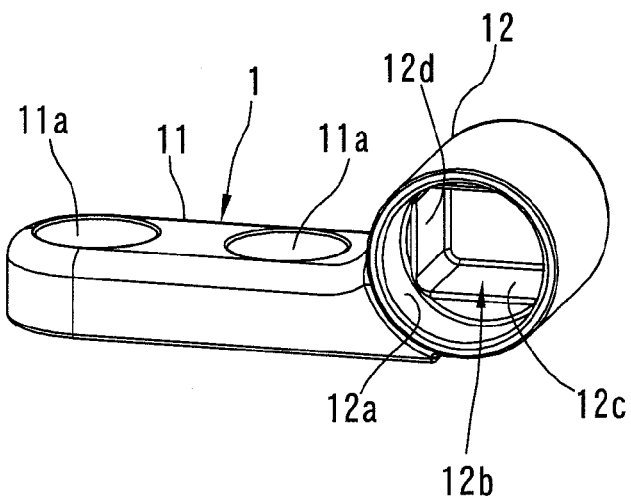
FIG. 23 is a perspective view of the first bracket.
Figure 24:
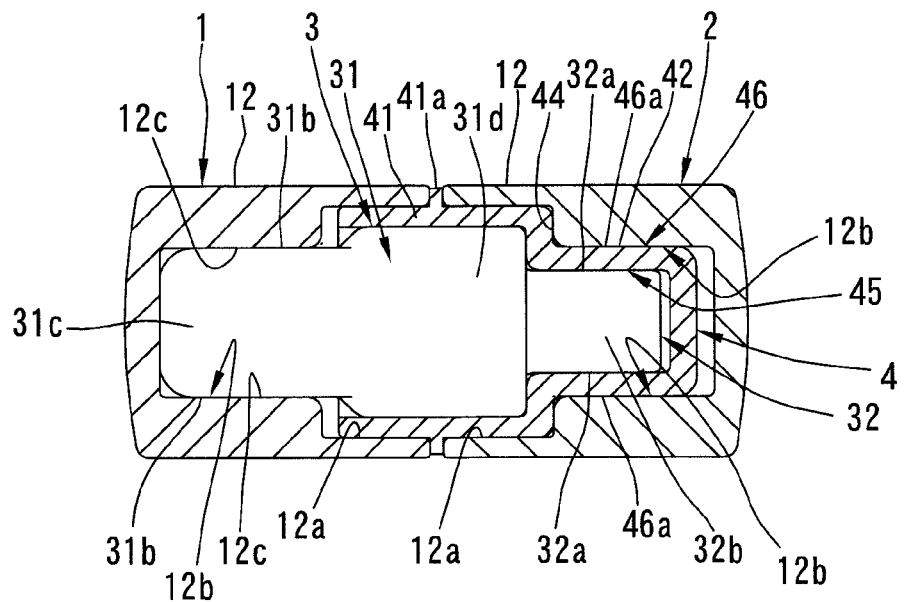
FIG. 24 is a cross-sectional view similar to FIG. 5, showing a second embodiment of the present invention.
Figure 25:
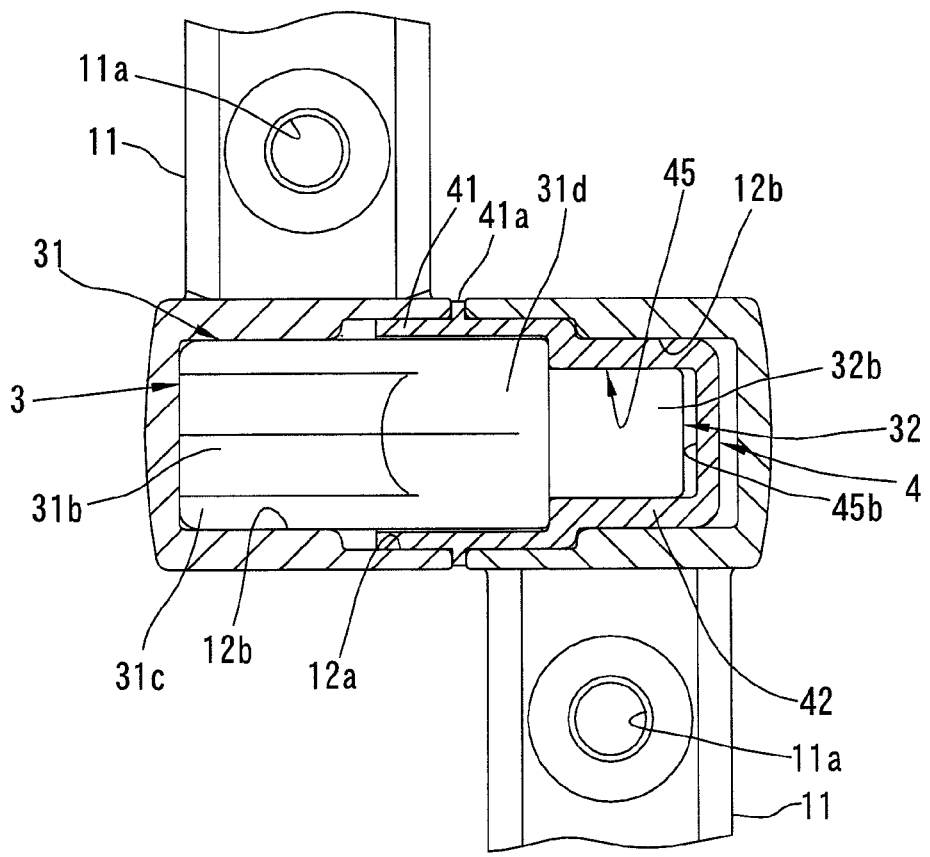
FIG. 25 is a cross-sectional view similar to FIG. 6, showing the second embodiment of the present invention.
Figure 26:
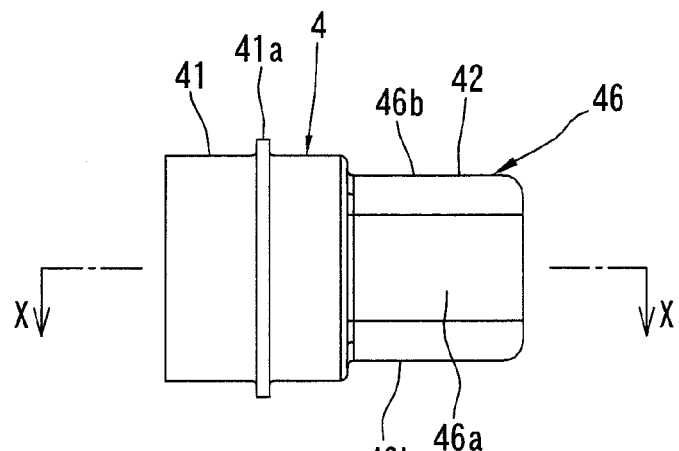
FIG. 26 is a plan view of an adapter used in the second embodiment.
Figure 27:
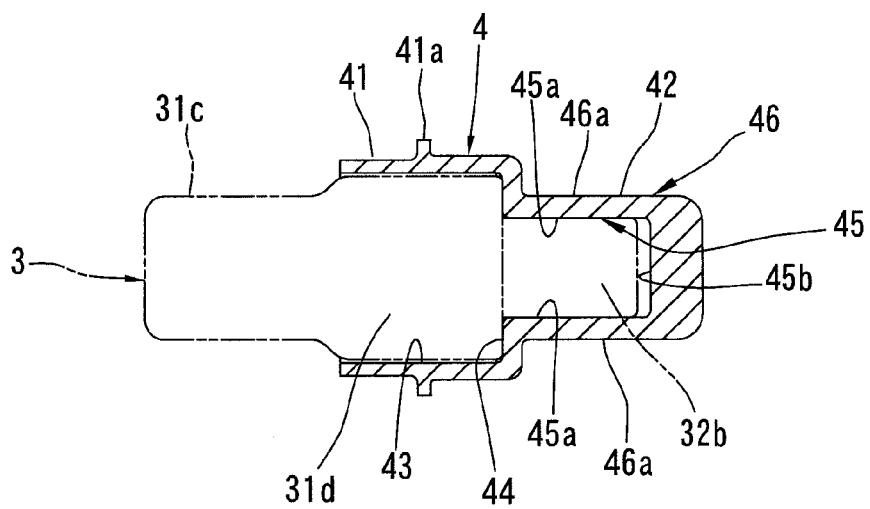
FIG. 27 is a cross-sectional view along line X-X of FIG. 26.
Figure 28:
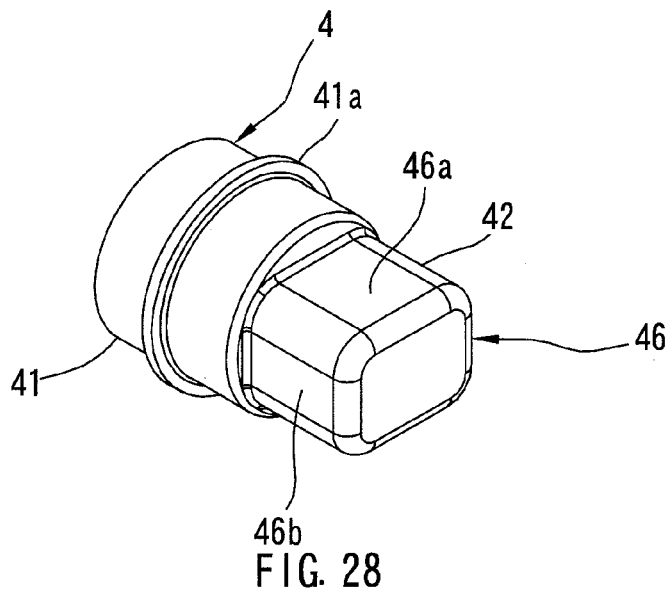
FIG. 28 is a perspective view of the adapter.
Figure 29:
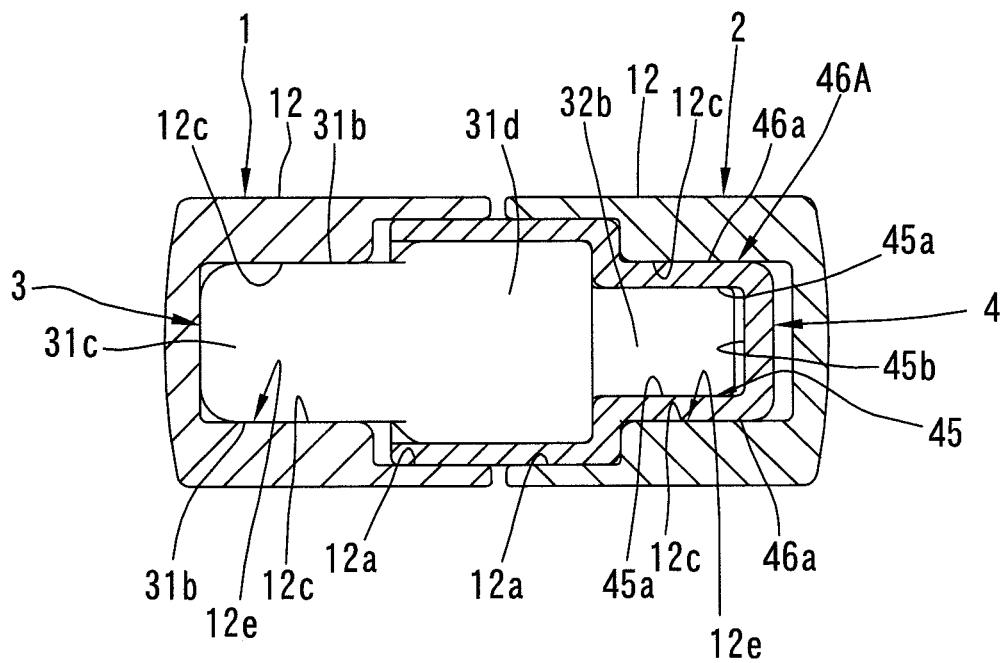
FIG. 29 is a cross-sectional view similar to FIG. 5, showing a third embodiment of the present invention.
Figure 30:
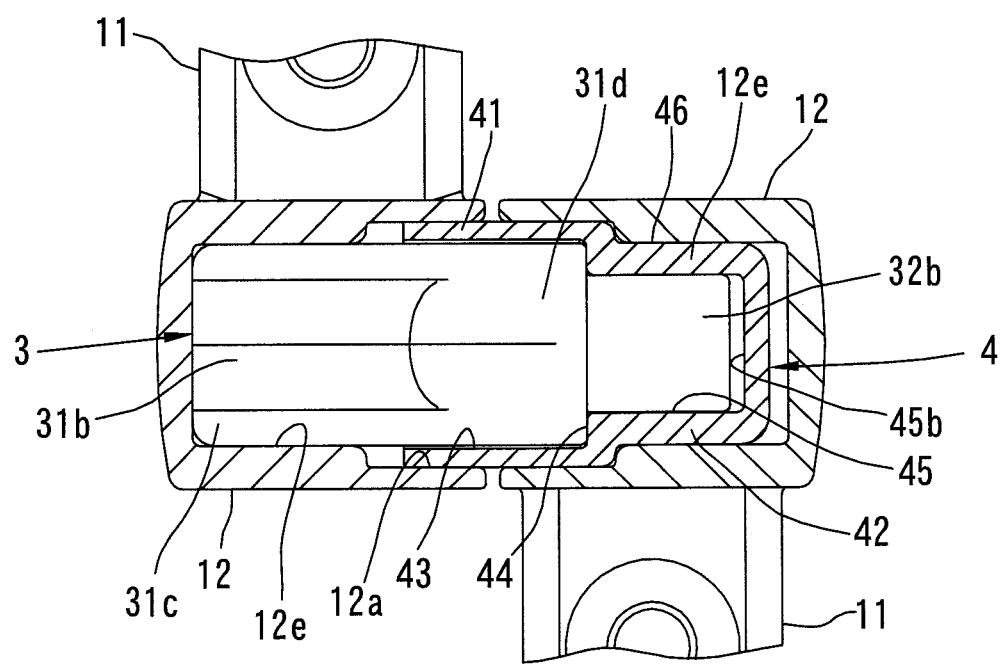
FIG. 30 is a cross-sectional view similar to FIG. 6, showing the third embodiment of the present invention.

The fitting cylindrical part 41 is formed as a circular cylinder having constant inner and outer diameters, and an internal space of the fitting cylindrical part 41 is a large-diameter hole part 43. The large-diameter hole part 43 is coaxial with an outer circumferential surface of the fitting cylindrical part 41. An inner diameter of the large-diameter hole part 43 is sized to be generally the same as the outer diameter of the circular cylindrical portion 31*d* of the damper body 31. As shown in FIGS. 16 and 17, the circular cylindrical portion 31*d* is fitted in the large-diameter hole part 43 almost without a gap in a removable manner. A length of the large-diameter hole part 43 is sized to be generally the same as a length of the circular cylindrical portion 31*d*. An abutment surface 44 to be described later is formed in a basal end portion of the large-diameter hole part 43. When the circular cylindrical portion 31*d* is inserted into the large-diameter hole part 43 until a distal end surface of the circular cylindrical portion 31*d* is abutted against the abutment surface 44, a general entirety of the circular cylindrical portion 31*d* is received in the large-diameter hole part 43. Moreover, positioning of the rotary damper 3 and the adapter 4 in the direction of the rotational axis L is accomplished by the abutment of the distal end surface of the circular cylindrical portion 31*d* against the abutment surface 44.

A small-diameter hole part 45 is formed inside the engagement cylindrical part 42. The small-diameter hole part 45 continues from the large diameter hole part 43 to a basal end side of the adapter 4. A diameter of the small-diameter hole part 45 is smaller than a diameter of the large-diameter hole part 43. The small-diameter hole part 45 is coaxially aligned with the large-diameter hole part 43. As a result, the abutment surface 44 orthogonal to the axis of the large-diameter hole part 43 and the small-diameter hole part 45 is formed between the large-diameter hole part 43 and the small-diameter hole part 45. An inner diameter of the small-diameter hole part 45 is sized to be generally the same as the outer diameter of the distal end portion of the rotor 32 protruded from the damper body 31, i.e., the outer diameter of the second engagement portion 32*b*. Two flat surface portions 45*a* are formed in an inner surface of the small-diameter hole part 45. The flat surface portions 45*a* extend along the axis of the small-diameter hole part 45 over an entire length of the small-diameter hole part 45. The two flat surface portions 45*a*, 45*a* are spaced from each other by 180 degrees in a circumferential direction of the small-diameter hole part 45. Moreover, a distance between the flat surface portions 45*a*, 45*a* is designed to be generally the same as a distance between the two flat surface portions 32*a*, 32*a* of the second engagement portion 32*b*. As a result, a cross-sectional configuration of the small-diameter hole part 45 is generally the same as a cross-sectional configuration of the second engagement portion 32*b*. The second engagement portion 32*b* is fitted in the small-diameter hole part 45 in a removable but non-rotatable manner. As shown in FIGS. 16 and 17, a basal end portion of the small-diameter hole part 45 is closed by a bottom surface 45*b* and a distal end surface of the second engagement portion 32*b* is slightly spaced from the bottom surface 45*b*.

A third engagement portion 46 is formed in an outer circumferential surface of the engagement cylindrical part 42. The third engagement portion 46 has a generally rectangular cross-sectional configuration. A center line (axis) of the third engagement portion 46 coincides with the axis of the fitting cylindrical part 41. The third engagement portion 46 has a pair of first flat surface portions 46*a*, 46*a* and a pair of second flat surface portions 46*b*, 46*b*. The first flat surface portions 46*a*, 46*a* and the second flat surface portions 46*b*, 46*b* extend along the axis of the third engagement portion 46. The first flat surface portions 46*a*, 46*a* are disposed on opposite sides of the axis of the third engagement portion 46 such that the first flat surface portions 46*a*, 46*a* are opposed to each other and equally distant from the axis of the third engagement portion 46. The second flat surface portions 46*b*, 46*b* are disposed on opposite sides of the axis of the third engagement portion 46 such that the second flat surface portions 46*b*, 46*b* are opposed to each other and equally distant from the axis of the third engagement portion 46. Moreover, the second flat surface portions 46*b*, 46*b* are disposed at right angles with the first flat surface portions 46*a*, 46*a*. A distance between the second flat surface portions 46*b*, 46*b* is longer than a distance between the first flat surface portions 46*a*, 46*a* by a predetermined length. The first flat surface portion 46*a* and the second flat surface portion 46*b* adjacent to each other are linked to each other through a circular arc surface bordering the first flat surface portion 46*a* and the second flat surface portion 46*b*. As a result, the third engagement portion 46 has a generally rectangular cross-sectional configuration. The first flat surface portion 46*a* and the second flat surface portion 46*b* may directly intersect each other without having the circular arc surface interposed therebetween.

To describe the distance between the first flat surface portions 46*a*, 46*a* and the distance between the second flat surface portions 46*b*, 46*b* more in detail, the distance between the first flat surface portions 46*a*, 46*a* is designed to be equal to the distance between the two flat surface portions 31*b*, 31*b* of the first engagement portion 31*c* of the damper body 31. On the other hand, the distance between the second flat surface portions 46*b*, 46*b* is designed to be equal to the outer diameter of the damper body 31, i.e., the outer diameter of the first engagement portion 31*c*. Therefore, when the first engagement portion 31*c* and the third engagement portion 46 are coaxially arranged and superposed in the axial direction thereof with the first flat surface portion 31*b* of the first engagement portion 31*c* and the first flat surface portion 46*a* of the third engagement portion 46 topologically aligned in the circumferential direction, the flat surface portions 31*b*, 31*b* of the first engagement portion 31*c* and the first flat surface portions 46*a*, 46*a* of the third engagement portion 46 are respectively positioned on the same location and an outer circumferential surface of the first engagement portion 31*c* is contacted with the second flat surface portion 46*b* of the third engagement portion 46 at a central portion in a width direction (direction in which the first flat surface portions 46*a*, 46*a* are opposed to each other) of the second flat surface portion 46*b*. In the foregoing relationship, the first engagement portion 31*c* is included in an area defined by an outline of the third engagement portion 46.

The first and second brackets 1, 2 will be described next. The second bracket 2 is disposed to be point symmetric to the first bracket 1. Although the second bracket 2 supports a different article from the first bracket 1, the second bracket 2 is of the same construction as the first bracket 1. Therefore, only the first bracket 1 will be described about its construction and the second bracket 2 will be described only about its difference from the first bracket 1.

As shown in FIGS. 1 to 8 and FIGS. 21 to 23, the first bracket 1 includes a mounting plate part 11 and a connecting cylindrical part 12. A screw insertion hole 11*a* is formed in the mounting plate part 11. The mounting plate part 11, and thereby the first bracket 1, is attached to the body by screwing a screw (not shown) inserted in the screw insertion hole 11*a* into the body and tightening up the screw. The mounting plate part 11 of the second bracket 2 is attached to the door D.

Figure 5:
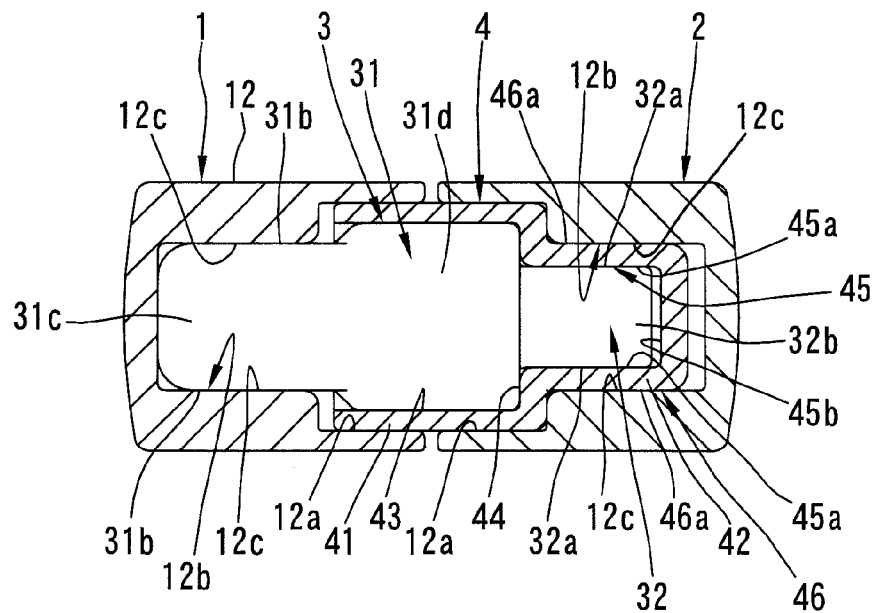
FIG. 5 is an enlarged cross-sectional view along line X-X of FIG. 2.
Figure 6:
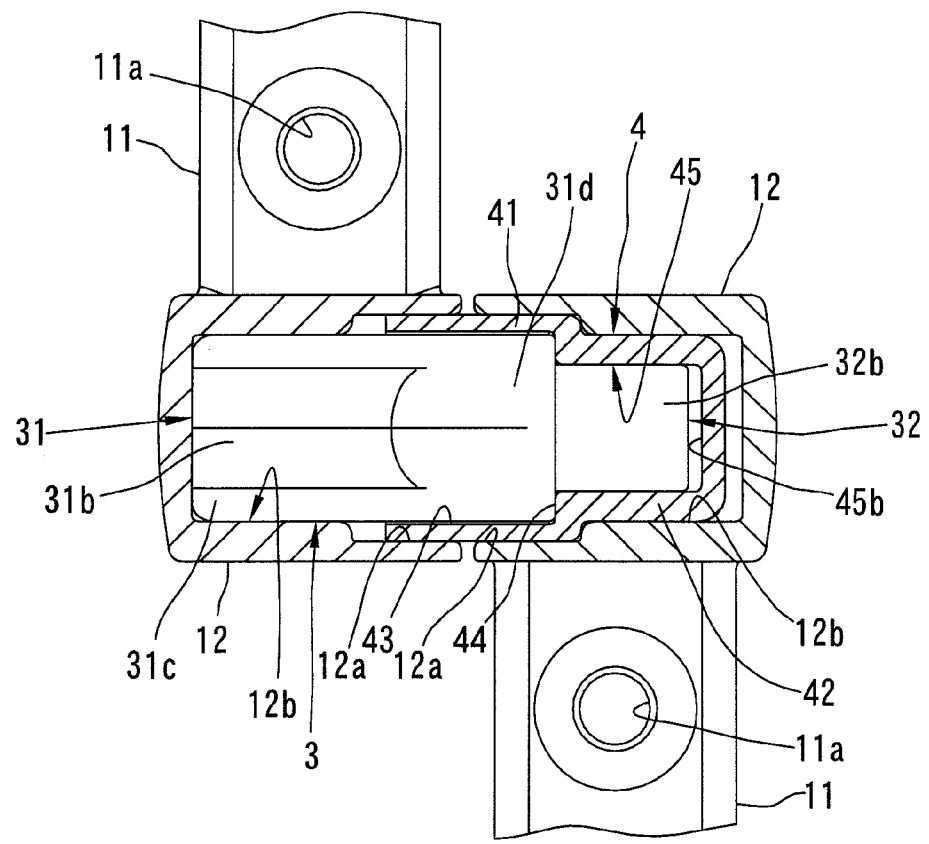
FIG. 6 is a partially omitted enlarged cross-sectional view along line X-X of FIG. 3.

The connecting cylindrical part 12 is integrally disposed in a distal end portion (lower end portion in FIGS. 1 and 2) of the mounting plate part 11. A support hole (first support hole) 12*a* is formed inside the connecting cylindrical part 12. The support hole 12a has a circular cross-sectional configuration and extends from a distal end surface (right end surface in FIGS. 5 and 6) of the connecting cylindrical part 12 toward a basal end portion of the connecting cylindrical part 12. An axis of the support hole 12a coincides with the rotational axis L. An inner diameter of the support hole 12a is sized to be generally equal to the outer diameter of the fitting cylindrical part 41 of the adapter 4. As shown in FIGS. 5 and 6, a generally half of the fitting cylindrical part 41 on a distal end side is rotatably fitted in the support hole 12a of the first bracket 1. A generally half of the fitting cylindrical part 41 of the adapter 4 on a basal end side is fitted in the support hole (second support hole) 12a of the second bracket. By this arrangement, the door D is supported by the body such that the door D can be rotated about the rotational axis L in a vertical direction. Moreover, a weight of the door D is supported by the fitting cylindrical part 41, and therefore, the weight of the door D hardly affects the rotary damper 3. As shown in FIGS. 5 and 6, positioning of the adapter 4 and the rotary damper 3 with respect to the second bracket 2 in the direction of the rotational axis L is accomplished by the abutment of a basal end portion of the fitting cylindrical part 41 against a bottom surface of the support hole 12a.

Figure 7:
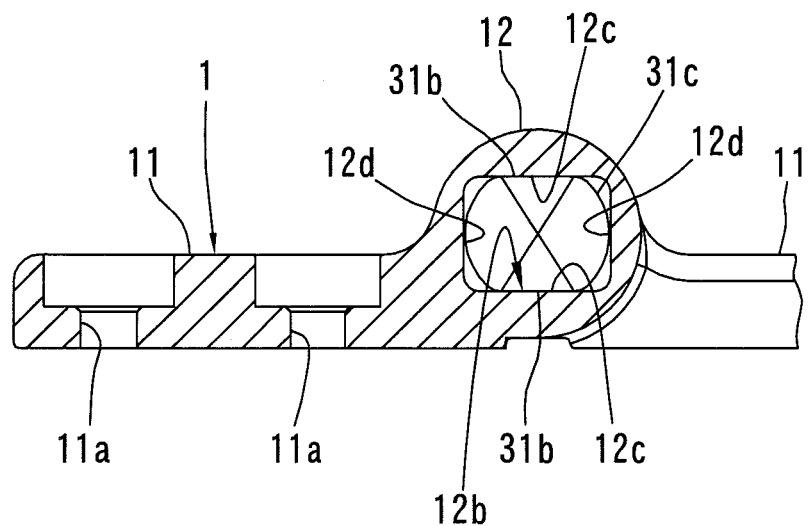
FIG. 7 is an enlarged cross-sectional view along line Y-Y of FIG. 2.

An engagement hole (first engagement hole) 12b extending from the bottom surface of the support hole 12a further toward a distal end of the support hole 12a is formed inside the connecting cylindrical part 12. The engagement hole 12b is coaxially aligned with the support hole 12a. Moreover, as shown in FIG. 7, the engagement hole 12b has a generally quadrangular cross-sectional configuration, which is generally the same as the cross-sectional configuration of the third engagement portion 46 of the adapter 4. To be more specific, a pair of first flat surface portions 12c, 12c and a pair of second flat surface portions 12d, 12d extending along an entire length of the engagement hole 12b are formed in an inner circumferential surface of the engagement hole 12b. The first flat surface portions 12c, 12c are disposed on opposite sides of the axis of the engagement hole 12a such that the first flat surface portions 12c, 12c are opposed to each other and equally distant from the axis of the engagement hole 12a. Moreover, a distance between the first flat surface portions 12c, 12c is designed to be generally equal to the distance between the first flat surface portions 46a, 46a of the third engagement portion 46. The second flat surface portions 12d, 12d are disposed at right angles with the first flat surface portion 12c. Moreover, the second flat surface portions 12d, 12d are disposed on opposite sides of the axis of engagement hole 12a such that the second flat surface portions 12d, 12d are opposed to each other and equally distant from the axis of the engagement hole 12a. A distance between the second flat surface portions 12d, 12d is designed to be generally equal to the distance between the second flat surface portions 46b, 46b of the third engagement portion 46. The first flat surface portion 12c and the second flat surface portion 12d adjacent to each other are linked to each other through a circular arc surface identical to the circular arc surface used in the third engagement portion 46. As a result, the cross-sectional configuration of the engagement hole 12b is the same as the cross-sectional configuration of the third engagement portion 46 of the adapter 4.

The cross-sectional configuration of the engagement hole 12b is the same as the cross-sectional configuration of the third engagement portion 46. Moreover, as mentioned above, the first engagement portion 31c of the damper body 31 is included in the area defined by the outline of the third engagement portion 46. Therefore, the first engagement portion 31c can be removably inserted in the engagement hole 12b. As shown in FIG. 7, when the first engagement portion 31c is inserted in the engagement hole 12b, the flat surface portions 31b, 31b of the first engagement portion 31c is surface-contacted with the first flat surface portions 12c, 12c and the outer circumferential surface of the first engagement portion 31c contacts the second flat surface portion 12d at a central portion in a width direction (direction in which the first flat surface portions 12b, 12b are opposed to each other) of the second flat surface portion 12d. By this arrangement, the first engagement portion 31c of the damper body 31 is non-rotatably inserted in the engagement hole 12b without play. As a result, the damper body 31 is non-rotatably connected to the body through the first bracket 1.

As shown in FIG. 5, a basal end surface of the first engagement portion 31c (basal end surface of the damper body 31) is abutted against a bottom surface of the engagement hole 12b, and thereby positioning of the rotary damper 3 with respect to the first bracket 1 is accomplished. As shown in FIGS. 5 and 6, a gap having predetermined dimensions is formed between distal end surfaces of the first and second brackets 1, 2 opposed to each other.

Figure 8:
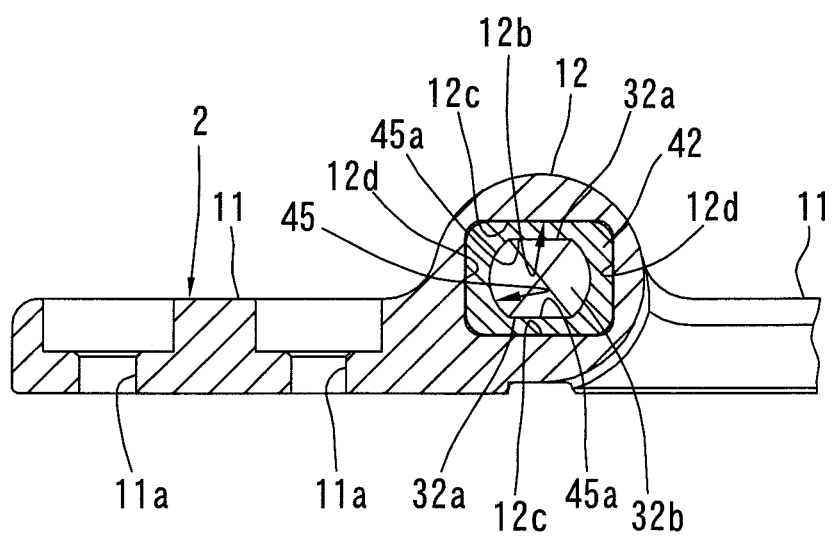
FIG. 8 is an enlarged cross-sectional view along line Z-Z of FIG. 2.
Figure 9:
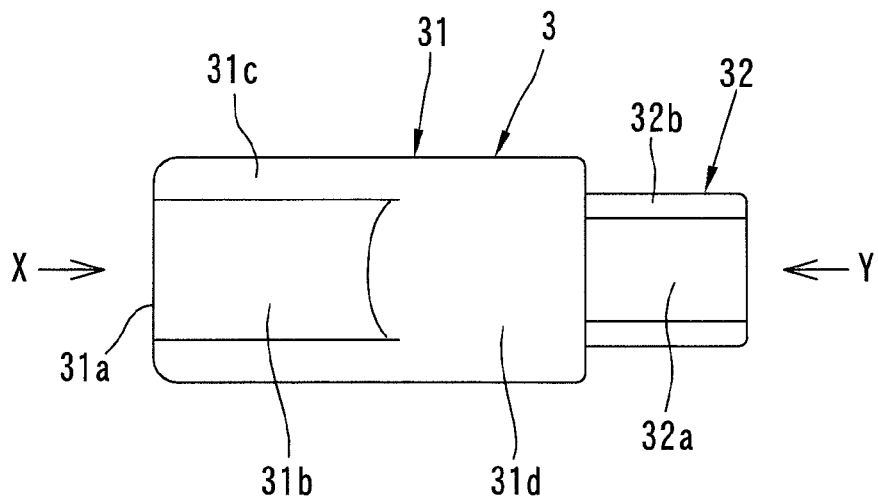
FIG. 9 is a plan view of a rotary damper used in the first embodiment.
Figure 10:
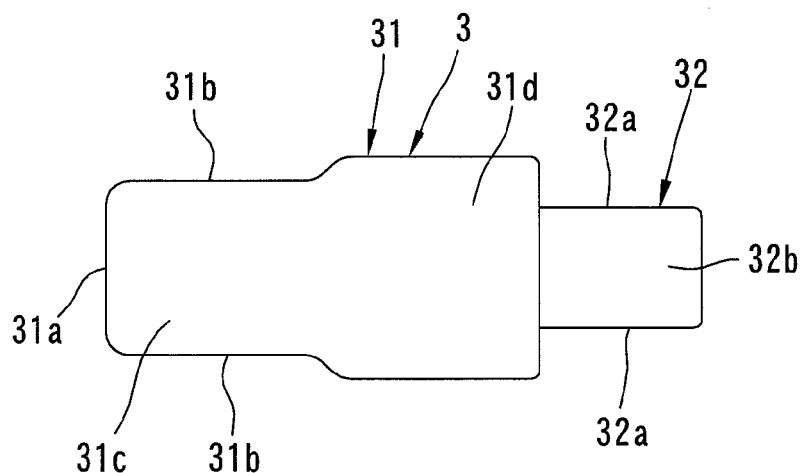
FIG. 10 is a front view of the rotary damper.
Figure 11:
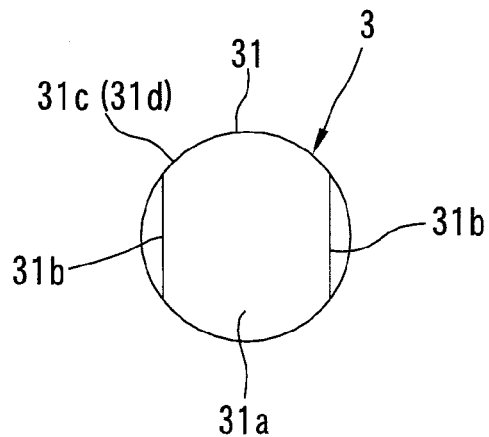
FIG. 11 is a view on arrow X of FIG. 9.
Figure 12:
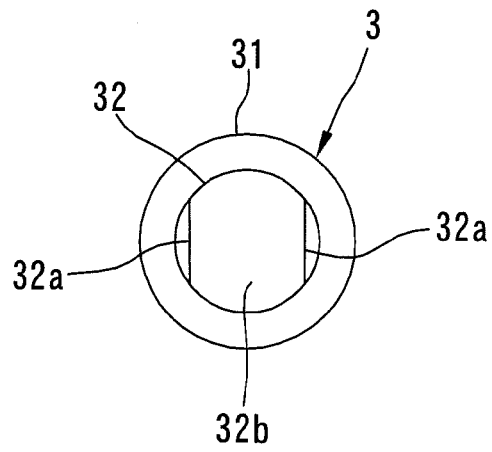
FIG. 12 is a view on arrow Y of FIG. 9.
Figure 13:
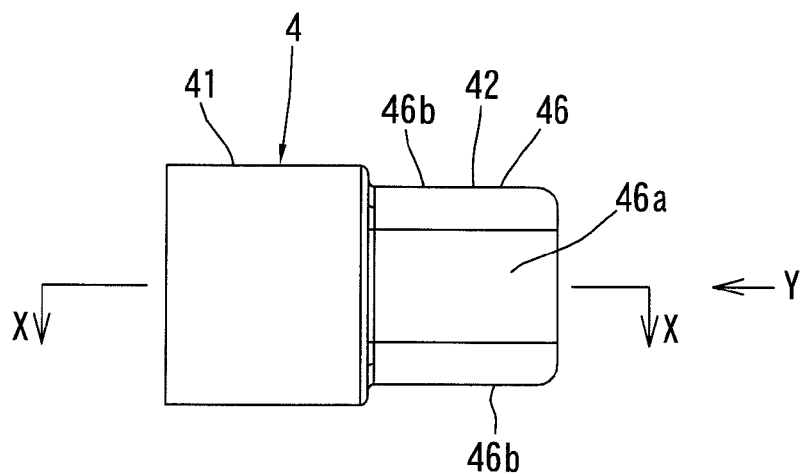
FIG. 13 is a plan view of an adapter used in the first embodiment.
Figure 14:
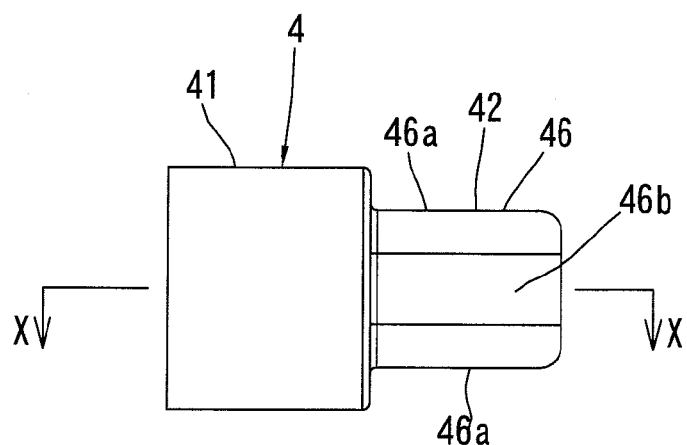
FIG. 14 is a front view of the adapter.
Figure 15:
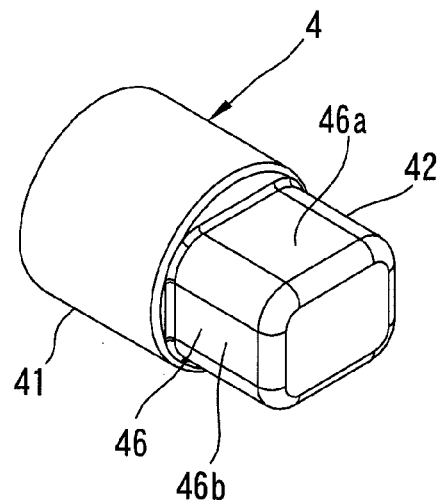
FIG. 15 is a perspective view of the adapter.

Since the cross-sectional configuration of the engagement hole 12b and the cross-sectional configuration of the third engagement portion 46 of the adapter 4 are the same as mentioned above, the third engagement portion 46 can be removably inserted in the engagement hole 12b. As shown in FIG. 8, the third engagement portion 46 of the adapter 4 is non-rotatably inserted in the engagement hole (second engagement hole) 12b of the second bracket 2. By this arrangement, the rotor 32 of the rotary damper 3 is non-rotatably connected to the second bracket 2, and thereby non-rotatably connected to the door D. Therefore, when the door D is rotated, the rotor 32 is rotated with respect to the damper body 3.

In the rotary damper apparatus A having the above-mentioned features, both of the first engagement portion 31c and the third engagement portion 46 can be non-rotatably inserted in the engagement holes 12b, 12b of the first and second brackets 1,2. Therefore, regardless of which of the first and second brackets 1, 2 is attached to which of the body and the door D, the damper body 31 and the rotor 32 of the rotary damper 3 can be connected to the first and second brackets 1, 2. Moreover, the damper body 31 and the rotor 32 of the rotary damper 3 can be connected to the first and second brackets 1, 2 such that a mounting relationship between the damper body 31 and the rotor 32 of the rotary damper 3 and a mounting relationship between the body and the door D are normal.

Since particularly in this embodiment, the engagement hole 12b of the second bracket 2 has the same cross-sectional configuration as the engagement hole 12b of the first bracket 1, the identical brackets can be used as the first and second brackets 1, 2. Therefore, manufacturing cost and administrative cost of the brackets 1, 2 can be reduced.

The first engagement portion 31c of the damper body 31 and the third engagement portion 46 of the adapter 4 can be respectively directly attached to one and the other of the body and the door D in a non-rotatable manner without using the first and second brackets 1, 2. In this case, all that is required is to form engagement holes having the same dimensions in the body and the door D so that the first engagement portion 31c is non-rotatably inserted in one of the engagement holes and the third engagement portion 46 is non-ratatably inserted in the other of the engagement holes. Therefore, mounting cost of the rotary damper apparatus can be reduced.

Other embodiments of the present invention will be described hereinafter. Only the features different from the features of the embodiment mentioned above will be described. Components same as the components of the embodiment mentioned above will be given the same reference numerals, and the description of such components will be omitted.

FIGS. 24 to 28 show a second embodiment of the present invention. In this embodiment, an annular protruded portion 41a is formed in the outer circumferential surface of the fitting cylindrical part 41. The annular protruded portion 41a is formed in a central portion in an axial direction of the fitting cylindrical part 41. An outer diameter of the annular protruded portion 41a is designed to be generally equal to or slightly smaller than an outer diameter of the connecting cylindrical part 12. A width (dimension in the direction of the rotational axis L) of the annular protruded portion 41a is designed to be equal to or slightly smaller than a distance between the connecting cylindrical parts 12, 12 of the first and second brackets 1, 2 of the embodiment described above. The width of the annular protruded portion 41a may be slightly wider than the distance between the connecting cylindrical parts 12, 12. When the width of the annular protruded portion 41a is designed to be equal to or slightly smaller than the distance between the connecting cylindrical parts 12, 12, the annular protruded portion 41a is used to increase aesthetic value by generally filling the gap between the connecting cylindrical parts 12, 12. On the other hand, when the width of the annular protruded portion 41a is designed to be wider than the distance between the connecting cylindrical parts 12, 12, positioning of the first and second brackets 1, 2 with respect to the rotary damper 3 and the adapter 4 in the direction of the rotational axis L can be accomplished by respectively pressing the distal end surfaces of the connecting cylindrical parts 12, 12 against opposite end surfaces of the annular protruded portion 41a.

Figure 31:
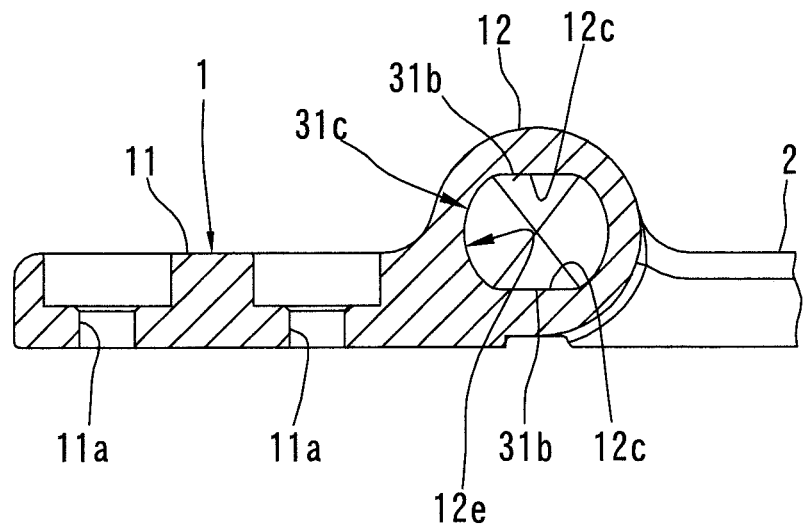
FIG. 31 is a cross-sectional view similar to FIG. 7, showing the third embodiment of the present invention.
Figure 32:
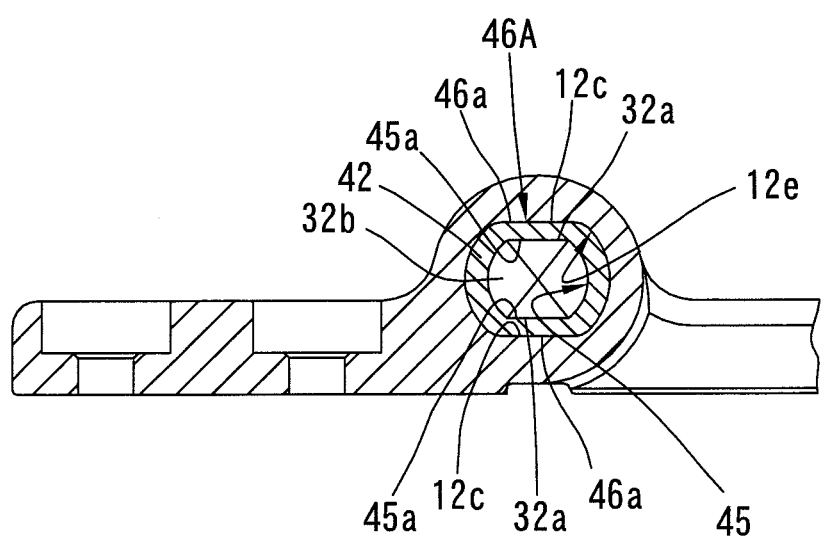
FIG. 32 is a cross-sectional view similar to FIG. 8, showing the third embodiment of the present invention.
Figure 33:
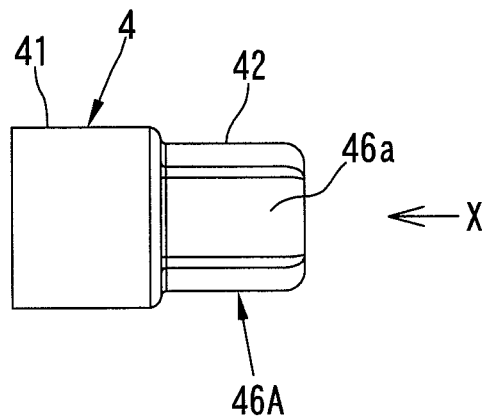
FIG. 33 is a plan view of an adapter used in the third embodiment.
Figure 34:
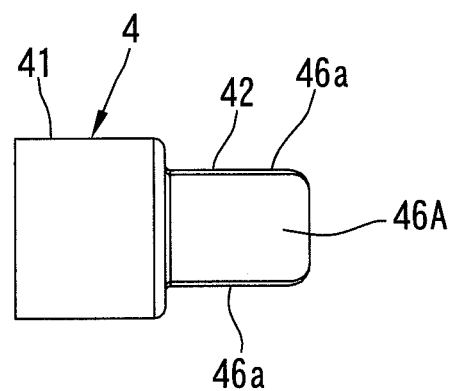
FIG. 34 is a front view of the adapter.
Figure 35:
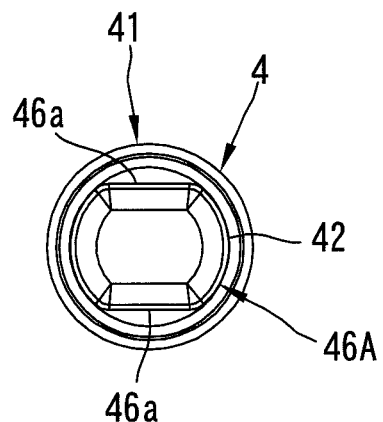
FIG. 35 is a view on arrow X of FIG. 33.
Figure 36:
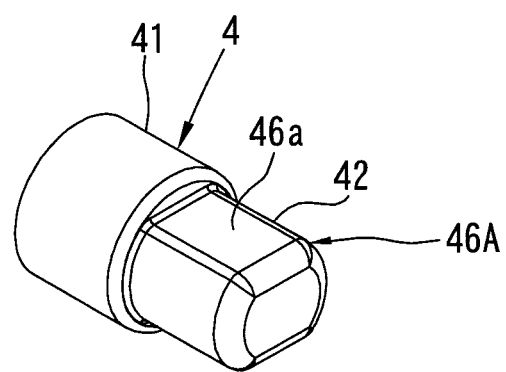
FIG. 36 is a perspective view of the adapter.
Figure 37:
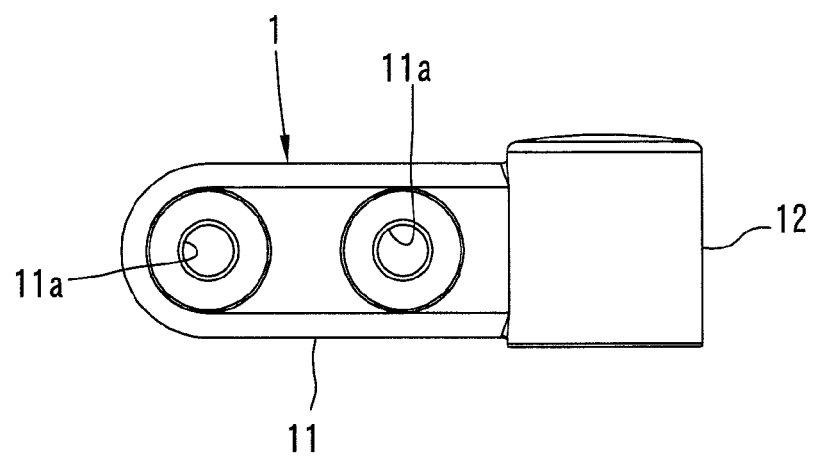
FIG. 37 is a plan view of a first bracket used in the third embodiment.
Figure 38:
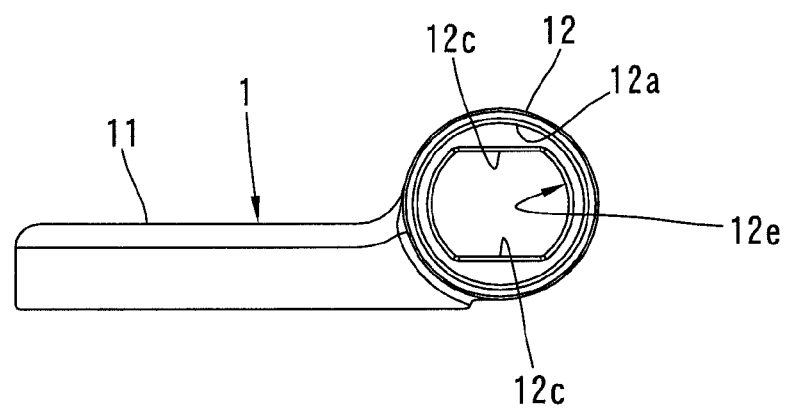
FIG. 38 is a front view of the first bracket.
Figure 39:
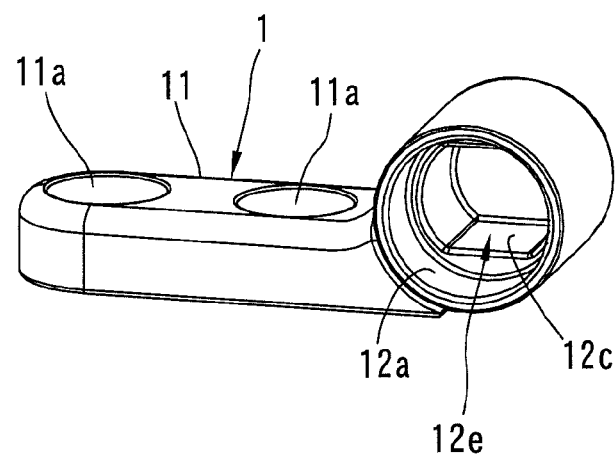
FIG. 39 is a perspective view of the first bracket.
Figure 40:
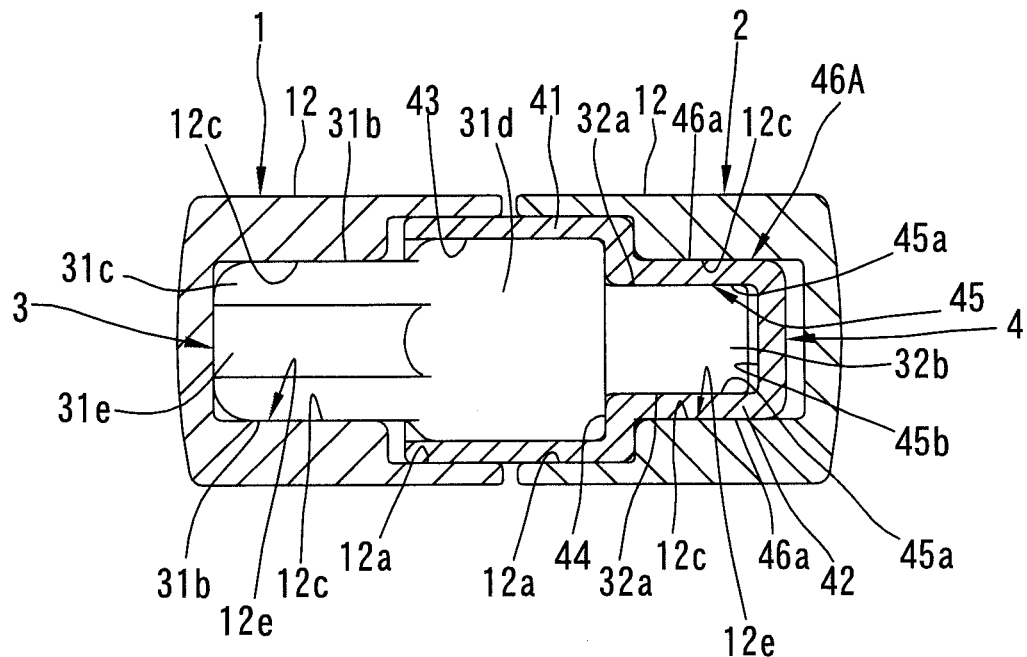
FIG. 40 is a cross-sectional view similar to FIG. 5, showing a fourth embodiment of the present invention.
Figure 41:
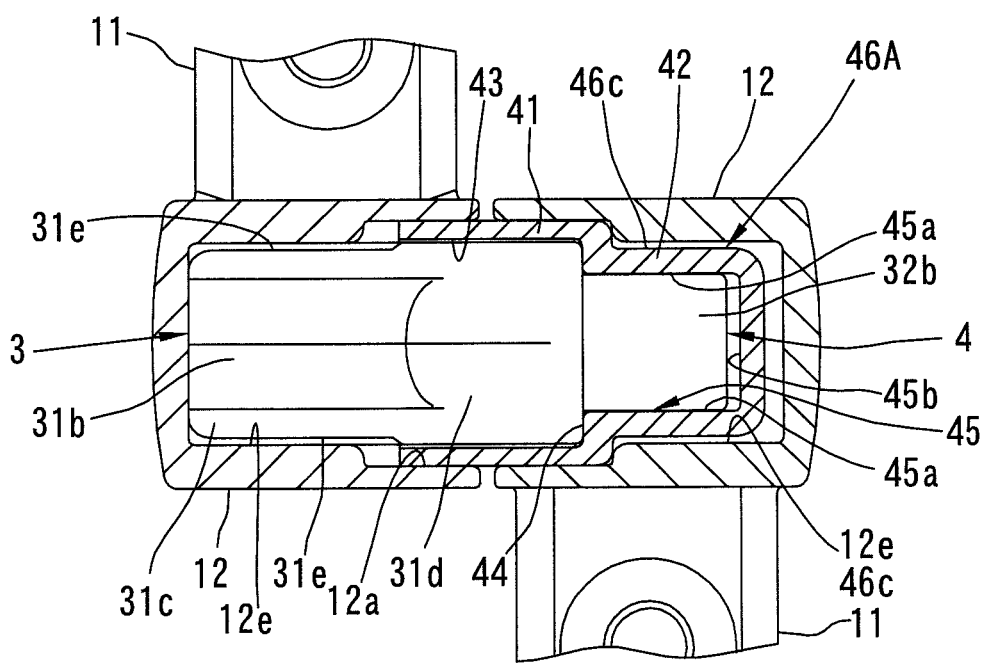
FIG. 41 is a cross-sectional view similar to FIG. 6, showing the fourth embodiment of the present invention.
Figure 42:
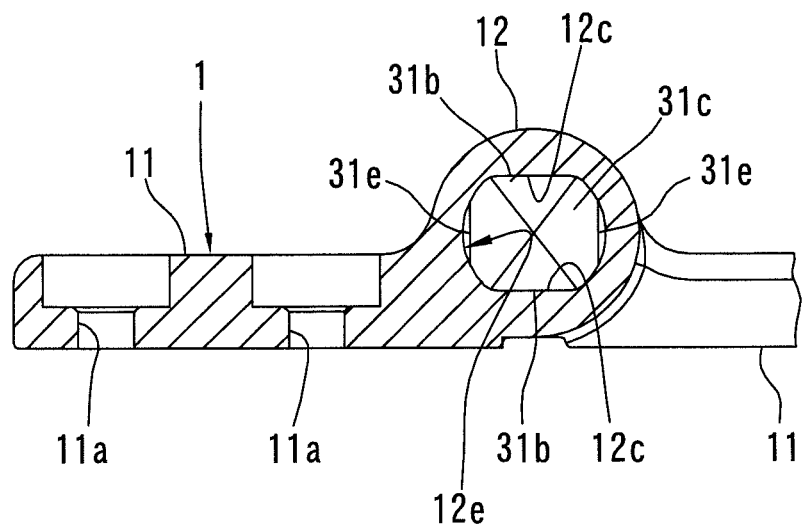
FIG. 42 is a cross-sectional view similar to FIG. 7, showing the fourth embodiment of the present invention.
Figure 43:
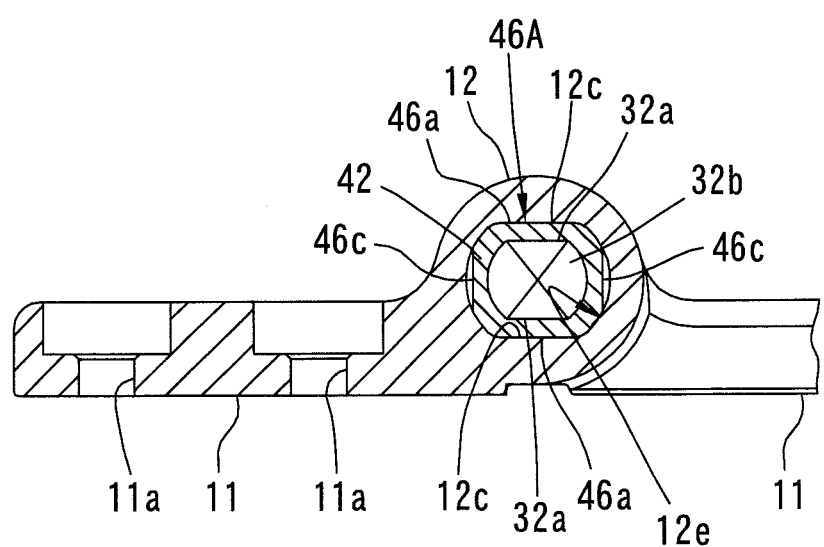
FIG. 43 is a cross-sectional view similar to FIG. 8, showing the fourth embodiment of the present invention.
Figure 44:
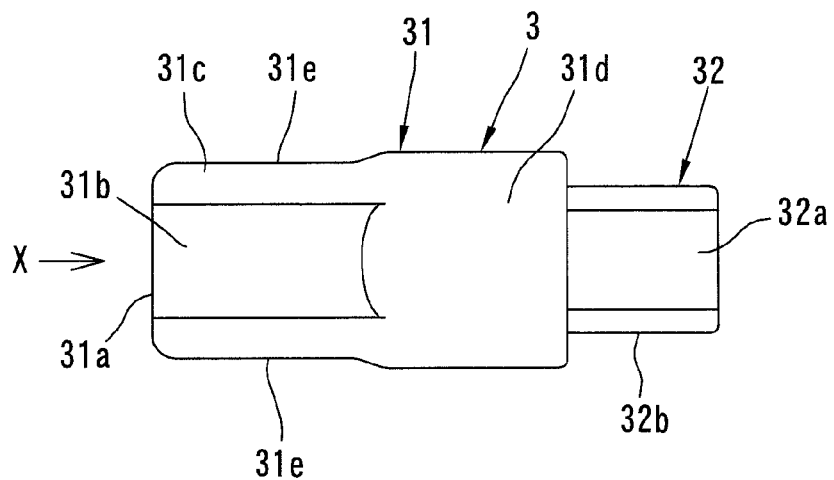
FIG. 44 is a plan view of a rotary damper used in the fourth embodiment.
Figure 45:
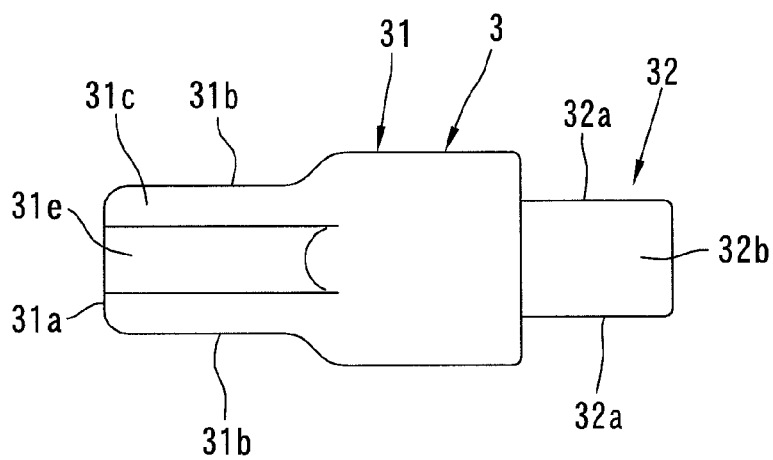
FIG. 45 is a front view of the rotary damper.
Figure 46:
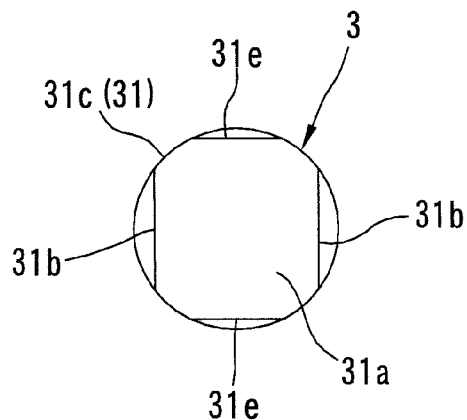
FIG. 46 is a view on arrow X of FIG. 44.
Figure 47:
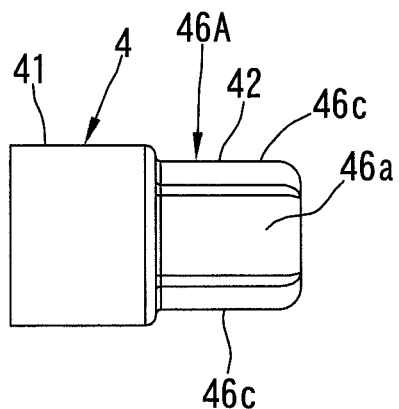
FIG. 47 is a plan view of an adapter used in the fourth embodiment.
Figure 48:
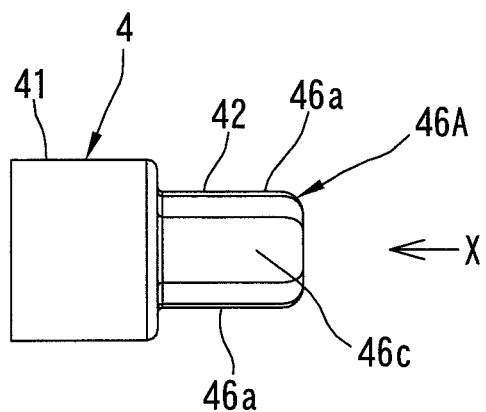
FIG. 48 is a front view of the adapter.

FIGS. 29 to 39 show a third embodiment of the present invention. In this embodiment, an engagement hole 12e, instead of the engagement hole 12b, is formed in the first and second brackets 1, 2. As shown in FIG. 31, the engagement hole 12e has the same cross-sectional configuration as the first engagement portion 31c. The first engagement portion 31c is removably but non-rotatably inserted in the engagement hole (first engagement hole) 12e of the first bracket 1. A third engagement portion 46A, instead of the third engagement portion 46, is formed in the adapter 4. The third engagement portion 46A is formed to have the same cross-sectional configuration as the first engagement portion 31c. Therefore, as shown in FIG. 32, the cross-sectional configuration of the third engagement portion 46A is the same as the cross-sectional configuration of the engagement hole 12e. The third engagement portion 46A is removably but non-rotatably inserted in the engagement hole (second engagement hole) 12e of the second bracket 2.

FIGS. 40 to 50 show a fourth embodiment of the present invention. The fourth embodiment is a variation of the third embodiment described above. In the fourth embodiment, a flat surface portion 31e is formed in a central portion of a circular-arcuate portion of the outer circumferential surface of the first engagement portion 31c in the circumferential direction. The flat surface portion 31e extends along an entire length of the first engagement portion 31c. A flat surface portion 46c is formed in a central portion of a circular-arcuate portion of the third engagement portion 46A of the adapter 4 in the circumferential direction. The flat surface portion 46c extends along an entire length of the third engagement portion 46A. Accordingly, although the first engagement portion 31c and the third engagement portion 46A do not have the same cross-sectional configuration as the engagement hole 12e, when the first engagement portion 31c, the third engagement portion 46A and the engagement hole 12e are superposed in the axial direction, the first engagement portion 31c and the third engagement portion 46A are included in the engagement hole 12e. The first engagement portion 31c and the third engagement portion 46A can be non-rotatably inserted in the engagement hole 12e. The flat surface portion 31e may be formed only in the first engagement portion 31c. The flat surface portion 46c may be formed only in the third engagement portion 46A It means that as long as the first engagement portion 31c and the third engagement portion 46A can be non-rotatably inserted in the engagement hole 12e, the configuration of the first engagement portion 31c and the configuration of the third engagement portion 46 may be different from each other.

Figure 51:
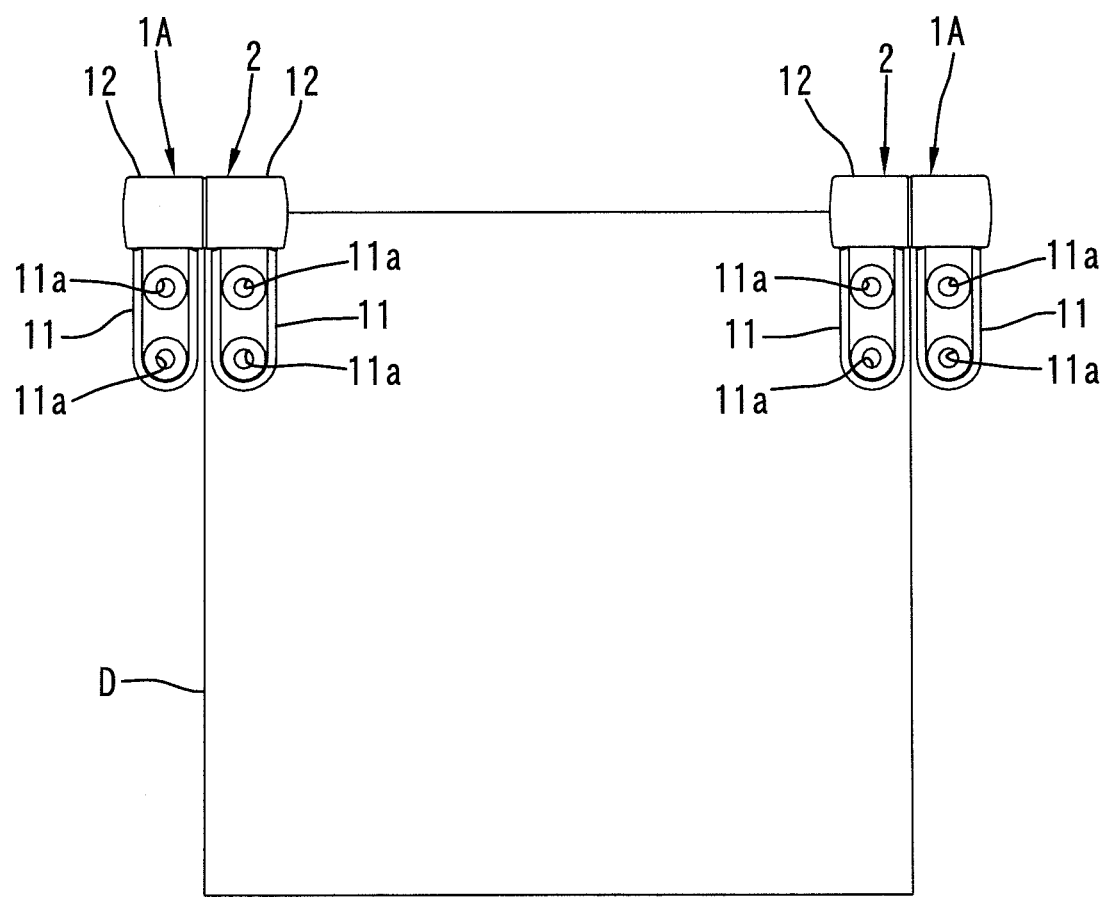
FIG. 51 is a view similar to FIG. 1, showing a fifth embodiment of the present invention.

FIG. 51 shows a fifth embodiment of the present invention. In this embodiment, a first bracket 1A is used instead of the first bracket 1. The first bracket 1A is constructed in mirror symmetry to the second bracket 2.

The present invention is not limited to the embodiments mentioned above. Various modifications can be adopted without departing from the scope and spirit of the invention.

For example, although in the embodiments described above, the fitting cylindrical part 41 is provided in the adapter 4, the fitting cylindrical part 41 may be omitted. In this case, load of the door D is supported by the rotary damper 3 through the brackets 1, 2.

Moreover, in the embodiments described above, the same engagement holes (the first and second engagement holes) 12b (12e) are formed in the first and second brackets 1, 2. This means that the first and second engagement holes of the first and second brackets 1, 2 have the same cross-sectional configuration. However, it is not required for the first engagement hole of the first bracket 1 and the second engagement hole of the second bracket 2 to have the same cross-sectional configuration. Instead, the first engagement hole and the second engagement hole may have different cross-sectional configurations as long as the first engagement portion 31c of the hinge body 31 and the third engagement portion 46 of the adapter 4 can be non-rotatably instead into the first and second engagement holes.

INDUSTRIAL APPLICABILITY

The damper apparatus according to the present invention can be used between a body and a door that opens and closes an opening of the body.

REFERENCE SIGNS LIST

A rotary damper apparatus
A' rotary damper apparatus
1 first bracket
1A first bracket
2 second bracket
3 rotary damper
4 adapter
12a support hole (first support hole; second support hole)
12b engagement hole (first engagement hole; second engagement hole)
12e engagement hole (first engagement hole; second engagement hole)
31 damper body
31c first engagement portion
32 rotor
32b second engagement portion
41 fitting cylindrical part
41a annular protruded portion 46 third engagement portion
46A third engagement portion

The invention claimed is:

1. A rotary damper mounting assembly for use with a rotary damper, the rotary damper comprising:
   a damper body;
   a rotor comprising a basal end portion rotatably disposed in the damper body, and a distal end portion protruded out of the damper body;
   a first engagement portion being formed in the damper body; and
   a second engagement portion formed in the distal end portion of the rotor protruded out of the damper body,
   wherein outer dimensions of the second engagement portion are smaller than outer dimensions of the first engagement portion,
   wherein the first engagement portion is non-rotatably and removably inserted in a first engagement hole of a first bracket,
   wherein the second engagement portion is non-rotatably and removably inserted in a second engagement hole of a second bracket,
   wherein the first engagement portion is non-rotatably insertable and removable into and from the first engagement hole and the second engagement hole,
   wherein the mounting assembly comprises a cylindrical adapter,
   wherein the second engagement portion is non-rotatably and removably inserted into the adapter,
   wherein a third engagement portion is formed in an outer circumferential surface of the adapter,
   wherein the third engagement portion is non-rotatably insertable into the first engagement hole and the second engagement hole, and
   wherein the second engagement portion is non-rotatably inserted in the second engagement hole through the third engagement portion.

2. The rotary damper mounting assembly according to claim 1, wherein:
   the damper body is formed in a cylindrical configuration having a bottom portion in a basal end portion of the damper body; the first engagement portion is formed in a basal end portion of an outer circumferential surface of the damper body;
   a basal end portion of the rotor is rotatably inserted in the damper body; and
   the second engagement portion is formed in a distal end portion of the rotor protruded out of the damper body.

3. The rotary damper mounting assembly according to claim 2, wherein:
   a fitting cylindrical part is integrally provided in a distal end portion of the adapter on the damper body side;
   a distal end portion of the damper body is rotatably fitted in the fitting cylindrical part; and
   the second engagement portion is non-rotatably inserted in a basal end portion of the adapter.

4. The rotary damper mounting assembly according to claim 3, wherein:
   an annular protruded portion is formed in a central portion of an outer circumferential surface of the fitting cylindrical part in an axial direction of the fitting cylindrical part; and
   the annular protruded portion extends in an annular configuration along a circumferential direction of the fitting cylindrical part.

5. The rotary damper mounting assembly according to claim 3, wherein:
   a first support hole is formed in the first bracket;
   a distal end portion of the fitting cylindrical part can be rotatably fitted into the first support hole;
   the first engagement hole is formed in a bottom portion of the first support hole;
   a second support hole is formed in the second bracket;
   a basal end portion of the fitting cylindrical part can be rotatably fitted into the second support hole; and
   the second engagement hole is formed in a bottom portion of the second support hole.

6. The rotary damper mounting assembly according to claim 3, wherein;
   a cross-sectional configuration of the first engagement portion and a cross-sectional configuration of the third engagement portion are identical to each other; and
   a cross-sectional configuration of the first engagement hole and a cross-sectional configuration of the second engagement hole are identical to each other.

7. A rotary damper apparatus comprising:
   a rotary damper comprising:
      a damper body;
      a rotor comprising a basal end portion rotatably disposed in the damper body, and a distal end portion protruded out of the damper body;
      a first engagement portion being formed in the damper body;
      a second engagement portion formed in the distal end portion of the rotor protruded out of the damper body;
   a first bracket and a second bracket; and
   an adapter having a cylindrical configuration,
   wherein outer dimensions of the second engagement portion are smaller than outer dimensions of the first engagement portion,
   wherein a first engagement hole is formed in the first bracket,
   wherein a second engagement hole is formed in the second bracket,
   wherein the first engagement portion is insertable into the first engagement hole and the second engagement hole,
   wherein the second engagement portion is non-rotatably and removably inserted in the adapter,
   wherein a third engagement portion is formed in an outer circumferential surface of the adapter,
   wherein the third engagement portion is non-rotatably insertable into the first engagement hole and the second engagement hole, and
   wherein the second engagement portion is non-rotatably inserted in the second engagement hole through the third engagement portion.

8. The rotary damper apparatus according to claim 7, wherein
   the damper body is formed in a cylindrical configuration having a bottom portion in a basal end portion of the damper body;
   the first engagement portion is formed in a basal end portion of an outer circumferential surface of the damper body;
   a basal end portion of the rotor is rotatably inserted in the damper body; and
   the second engagement portion is formed in a distal end portion of the rotor protruded out of the damper body.

9. The rotary damper apparatus according to claim 8, wherein
   a fitting cylindrical part is integrally provided in a distal end portion of the adapter on the damper body side;

a distal end portion of the damper body is rotatably fitted in the fitting cylindrical part; and the second engagement portion is non-rotatably inserted in a basal end portion of the adapter.

10. The rotary damper apparatus according to claim 9, wherein:

an annular protruded portion is formed in a central portion of an outer circumferential surface of the fitting cylindrical part in an axial direction of the fitting cylindrical part; and the annular protruded portion extends in an annular configuration along a circumferential direction of the fitting cylindrical part.

11. The rotary damper apparatus according to claim 9, wherein a first support hole is formed in the first bracket;

a distal end portion of the fitting cylindrical part is rotatably fitted in the first support hole;

the first engagement hole is formed in a bottom portion of the first support hole;

a second support hole is formed in the second bracket;

a basal end portion of the fitting cylindrical part is rotatably fitted in the second support hole; and the second engagement hole is formed in a bottom portion of the second support hole.

12. The rotary damper apparatus according to claim 9, wherein:

a cross-sectional configuration of the first engagement portion and a cross-sectional configuration of the third engagement portion are identical to each other; and a cross-sectional configuration of the first engagement hole and a cross-sectional configuration of the second engagement hole are identical to each other.

* * * * *